United States Patent
Endo et al.

(10) Patent No.: US 8,035,894 B2
(45) Date of Patent: Oct. 11, 2011

(54) TRANSPARENT SCREEN, PROJECTION DISPLAY DEVICE, AND IMAGE DISPLAY METHOD

(75) Inventors: Takao Endo, Tokyo (JP); Yuzo Nakano, Tokyo (JP); Hayato Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/609,923

(22) Filed: Oct. 30, 2009

(65) Prior Publication Data

US 2010/0188745 A1    Jul. 29, 2010

Related U.S. Application Data

(63) Continuation-in-part of application No. 12/359,652, filed on Jan. 26, 2009, now abandoned.

(30) Foreign Application Priority Data

Jul. 6, 2009   (JP) .................................. 2009-159578

(51) Int. Cl.
  *G03B 21/56* (2006.01)
  *G03B 21/60* (2006.01)
(52) U.S. Cl. .......................... 359/449; 359/452; 359/589
(58) Field of Classification Search .................. 359/459, 359/742, 457, 455, 452–453; 375/260; 349/62
See application file for complete search history.

(56) References Cited

U.S. PATENT DOCUMENTS

| | | | | |
|---|---|---|---|---|
| 7,009,766 B2 * | 3/2006 | Hirata et al. | ................... | 359/455 |
| 7,242,536 B2 * | 7/2007 | Suzuki et al. | ................. | 359/742 |
| 7,656,580 B2 * | 2/2010 | Chang | ........................... | 359/452 |
| 7,742,536 B2 * | 6/2010 | Burg et al. | .................... | 375/260 |
| 7,852,433 B2 * | 12/2010 | Lee et al. | ......................... | 349/62 |
| 2002/0171930 A1 * | 11/2002 | Sekiguchi | ..................... | 359/457 |
| 2003/0174396 A1 * | 9/2003 | Murayama et al. | ........... | 359/453 |
| 2005/0099687 A1 * | 5/2005 | Watanabe | ...................... | 359/455 |
| 2007/0121208 A1 * | 5/2007 | Ogawa et al. | ................ | 359/457 |
| 2007/0285773 A1 * | 12/2007 | Ogawa | .......................... | 359/457 |
| 2008/0204868 A1 * | 8/2008 | Yoshikawa et al. | ........... | 359/457 |

FOREIGN PATENT DOCUMENTS

| | | |
|---|---|---|
| JP | 2004-271922 | 9/2004 |
| JP | 3606862 | 10/2004 |
| JP | 2004-341446 | 12/2004 |
| WO | 2009/075118 A1 | 6/2009 |

OTHER PUBLICATIONS

U.S. Appl. No. 12/908,267, filed Oct. 20, 2010, Endo, et al.
U.S. Appl. No. 12/747,420, filed Jun. 10, 2010, Endo, et al.
U.S. Appl. No. 12/419,422, filed Apr. 7, 2009, Endo, et al.

* cited by examiner

*Primary Examiner* — Clayton E Laballe
*Assistant Examiner* — Kevin Butler
(74) *Attorney, Agent, or Firm* — Oblon, Spivak, McClelland, Maier & Neustadt, L.L.P.

(57) ABSTRACT

A Fresnel lens screen 20 is comprised of a light entering surface partial total reflection type Fresnel lens 24, a first light diffusing part 26 disposed behind the Fresnel lens, and a first base 25. An image display element 30 disposed behind the Fresnel lens screen 20 has a lens element 31, a second base 32, and a third base 35. Second light diffusing parts 33 are disposed behind the second base 32. Each of the second light diffusing parts 33 includes two types of particulates having different particle sizes which are distributed therein.

15 Claims, 18 Drawing Sheets

TRANSPARENT SCREEN, PROJECTION DISPLAY DEVICE, AND IMAGE DISPLAY METHOD

CROSS-REFERENCE TO RELATED APPLICATIONS

This application is a continuation-in-part of co-pending U.S. patent application Ser. No. 12/359,652, filed Jan. 26, 2009, which claims priority to Japanese application 2008-205850, filed Aug. 8, 2008. This application claims priority to Japanese application 2009-159578, filed Jul. 6, 2009, the entire contents of which is hereby incorporated herein by reference.

BACKGROUND OF THE INVENTION

1. Field of the Invention

The present invention relates to a transparent screen, a projection display device, and an image display method for and of projecting image light onto a screen from the rear side of the screen as viewed from a viewer, so as to display an image.

2. Description of Related Art

There are projection display devices as a device which displays an image by using a combination of a Fresnel lens screen and diffusion sheets (diffusion layers). Unlike CRT (Cathode Ray Tube) and PDP (Plasma Display Panel), projection display devices are of nonluminescent type. A projection display device is provided with, as a projector, an illuminating optical system for guiding light from a light source toward a predetermined direction, a light valve to which the light guided by the illuminating optical system is applied, and for adjusting the amount of the light according to an image signal to form an image, and a projection optical system for enlarging and projecting the image formed by the light valve onto a screen thereof.

Projection display devices include rear projection type display devices each of which projects image light onto a screen from the rear side of the screen as viewed from a viewer, and front projection type display devices each of which projects image light onto a screen from the front side of the screen as viewed from a viewer. A transparent screen for use in a rear projection type display device among these devices is provided with a Fresnel lens screen for bending image light from a projector toward a viewer, and an image display element for forming the image light from the Fresnel lens screen into an image, and for providing an angle of diffusion for the image light so as to diffuse the image light.

Generally, because a Fresnel lens is formed in such a way as to have a lens pitch smaller than the size of projected pixels (e.g., one-tenth of the size of pixels), the Fresnel lens has a very thin size in its thickness direction (for example, the thickness including the prism portion is several hundreds of μm). Therefore, in order to hold the Fresnel lens, there is a necessity to provide a base having a thickness of about 1 to 5 mm. In many cases, the base is made from a resin, such as PMMA (Poly Methyl MethAcrylate), MS (Methyl methacylate Styrene), MBS (Methyl methacylate Butadiene Styrene), or PC (Polycarbonate), or glass. Furthermore, the Fresnel lens is formed directly on the base by using a light-curing resin or the like in many cases, and an element which is comprised of the Fresnel lens and the base is called a Fresnel lens screen.

The image display element is constructed in such a way as to include at least a light diffusing means and a base. The light diffusing means uses projections and depressions each having a larger surface than the wavelength of certain light (visible light having a wavelength ranging from 380 nm to 780 nm), or uses the difference between the refractive index of a diffusion layer substrate and that of particulates having a size larger than the wavelength of the certain light. When such the structure having larger fluctuations larger than the wavelength of the certain light is illuminated by light which is enlarged by a projection optical system so as to have large degree of spatial coherence, a large number of bright and dark spots (glaring) are recognized disorderly even if the light source is a lamp having small temporal degree of coherence. Generally, these light and dark spots are called speckles (strictly speaking, subjective speckles) or scintillation, and cause a problem of image degradation.

As measures against such speckles (scintillation), there have been proposed a method of arranging the diffusion layers included in the screen apart from one another (for example, refer to patent reference 1), a method of making the particle size of particulates whose refractive index difference with the diffusion layer substrate is large ($\Delta n > 0.08$) be smaller than about 20 times (10 μm) as long as the wavelength of the light λ (for example, refer to patent reference 2), and so on.

[Patent reference 1] Japanese patent No. 3606862
[Patent reference 2] JP, 2004-271922,A A problem with the above-mentioned conventional technology is, however, that in a case in which the gap between two adjacent diffusion layers is large, the image becomes blurred while the light propagates from the first diffusion layer to the next diffusion layer, and therefore the resolution decreases. A further problem is that in a case in which particulates having a large refractive index difference (a large dispersion of refractive index and a small particle size are used for the diffusion layers, the color temperature becomes low. This is because the path light follows bends at a different angle (diffuses with a different angle) according to its wavelength, i.e., color, and the path light follows bends at a larger angle (diffuses with a larger angle) as the refractive index difference becomes larger and the particle size becomes smaller. Although the reason can be explained on the basis of scattering problems for Maxwell's equations, it is generally known as the Mie scattering theory.

SUMMARY OF THE INVENTION

The present invention is made in order to solve the above-mentioned problems, and it is therefore an object of the present invention to provide a transparent screen, a projection display device, and an image display method for and of being able to produce an image display having a high color temperature and a high degree of resolution while reducing the image degradation due to speckles.

In accordance with the present invention, there is provided a transparent screen in which a Fresnel optical element having a prism which is formed on a side of a light entering surface side thereof when viewed from a side of a light emitting body, a first base for holding the Fresnel optical element, and a second base for holding a lens element for providing an angle of diffusion for an image light emitted from the light emitting body so as to diffuse the image light are arranged in turn, a first light diffusing means is disposed behind the Fresnel optical element and a second light diffusing means is disposed behind the second base, and there is a predetermined gap between the first light diffusing means and the second light diffusing means.

Because in the transparent screen in accordance with the present invention the first light diffusing means is disposed behind the Fresnel optical element and the second light diffusing means is disposed behind the second base in such a way that the second light diffusing means has a predetermined gap with the first light diffusing means, the transparent screen in accordance with the present invention can produce an image display having a high color temperature and a high degree of resolution while reducing the image degradation due to speckles.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
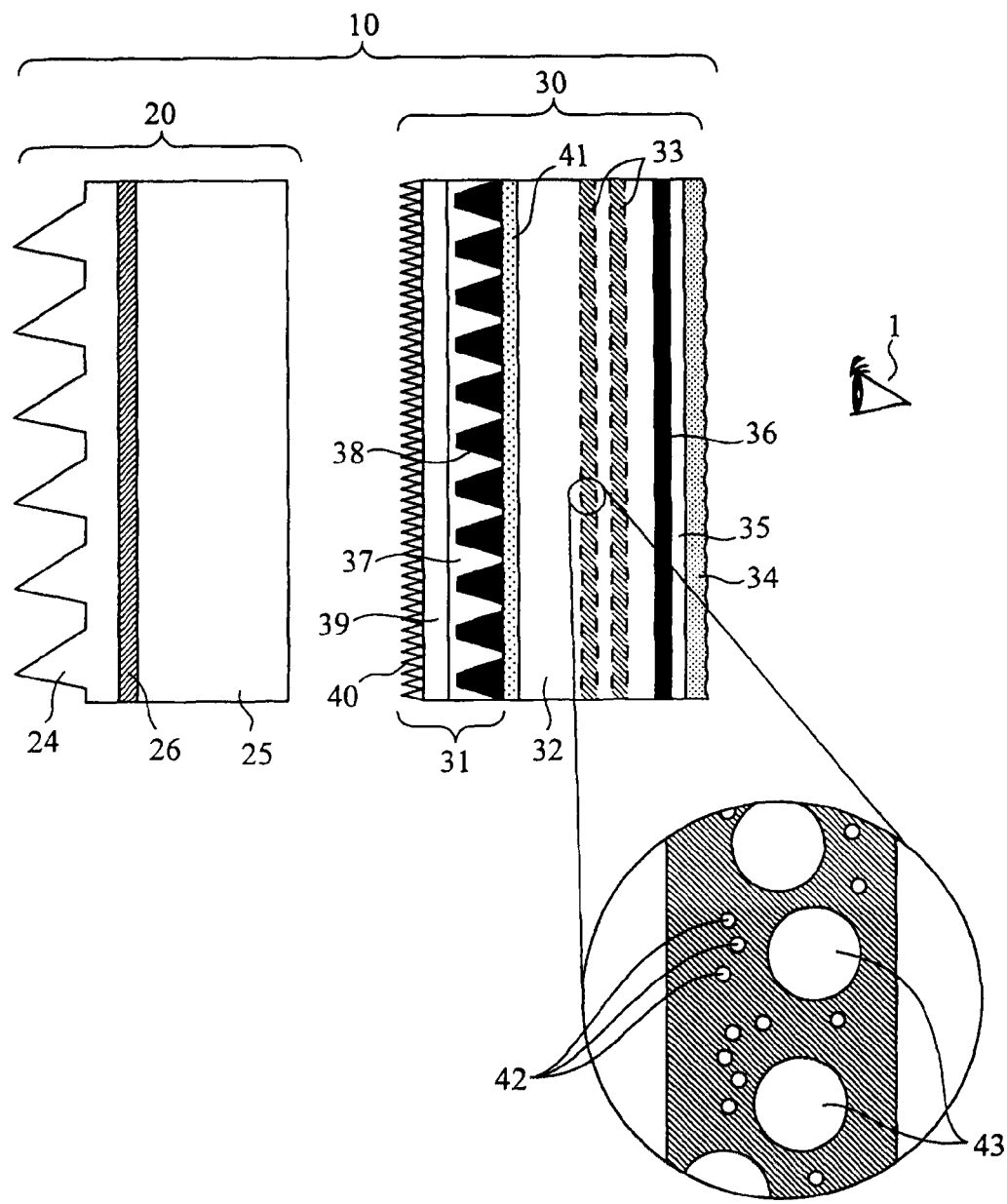
FIG. 1 is a block diagram showing a transparent screen in accordance with Embodiment 1 of the present invention.
Figure 2:
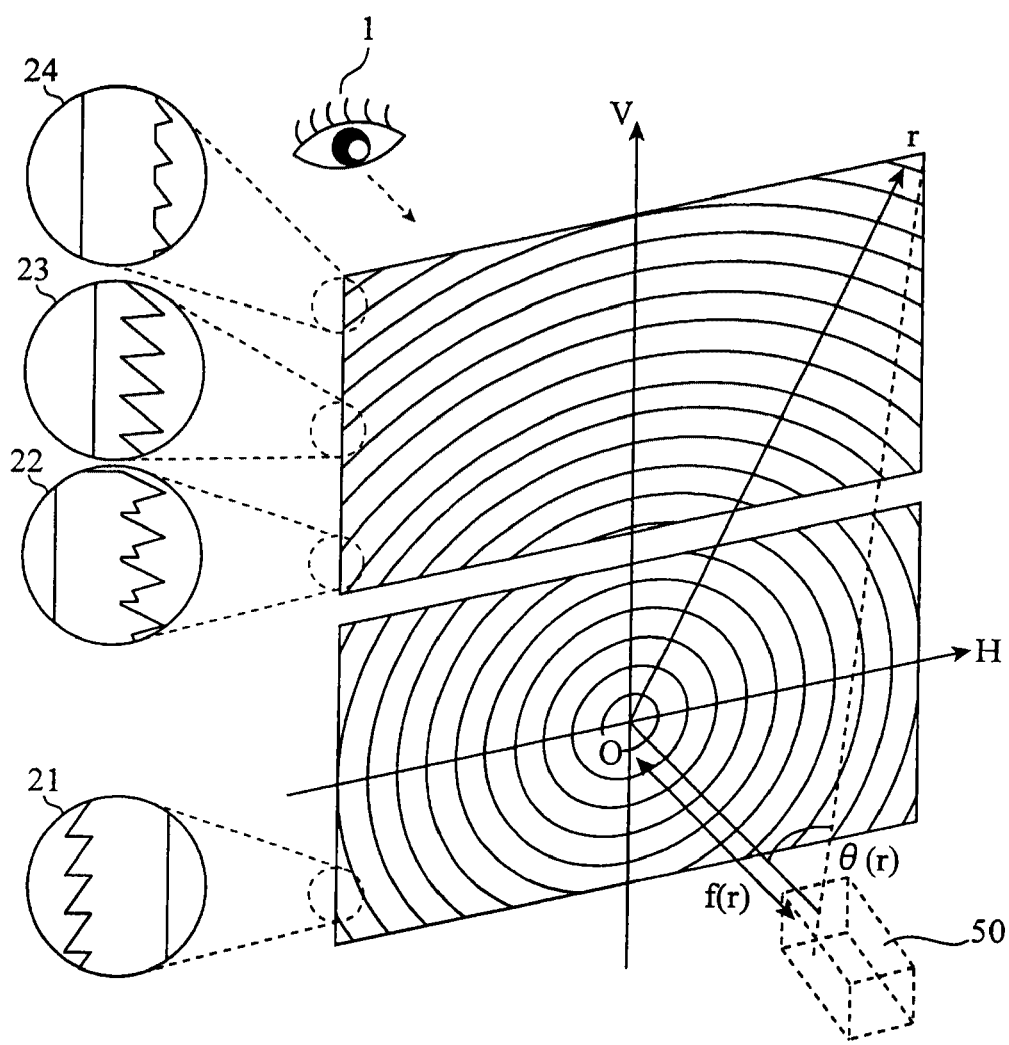
FIG. 2 is an explanatory drawing showing each of Fresnel lenses for use in the transparent screen in accordance with Embodiment 1 of the present invention.

FIG. 1 is a block diagram showing a transparent screen in accordance with Embodiment 1 of the present invention. In the figure, the transparent screen 10 is provided with a Fresnel lens screen 20 for bending image light (not shown) toward a viewer 1, and an image display element 30 for forming the image light from the Fresnel lens screen 20 into an image, and for providing an angle of diffusion for the image light so as to diffuse the image light. The transparent screen 10 has a structure of having a light source, a projection optical system, and so on which are arranged on a rear side thereof as viewed from the viewer 1. The structure of the transparent screen is briefly shown in FIG. 2. As shown in FIG. 2, as the Fresnel lens screen 20 having the function of bending the image light from a projector (a light emitting body) 50 which is comprised of the light source, an illuminating optical system, a light valve, and the projection optical system (which are not shown in the figure) toward the viewer 1, a Fresnel optical element, such as a light exiting surface side refraction type Fresnel lens 21 which is in widespread use and which has lenses formed on a side of the viewer (on a light exiting surface side), a mixed type Fresnel lens 22 in which lenses are formed on a side of the light source which is opposite to the viewer (on a light entering surface side), a light entering surface side total reflection type Fresnel lens 23, or a light entering surface partial total reflection type Fresnel lens 24, is used.

An example of using a light entering surface partial total reflection type Fresnel lens 24 which is the best mode will be explained in this Embodiment 1, though a light entering surface side total reflection type Fresnel lens 23 can be alternatively used (this will be explained below in detail). As the second best, either a mixed type Fresnel lens 22 or a light exiting surface side refraction type Fresnel lens 21 can be used, though this example is a little inferior to both of the above-mentioned examples of the best mode.

Referring again to FIG. 1, the Fresnel lens screen 20 is comprised of a light entering surface partial total reflection type Fresnel lens 24, a first base 25 for holding this light entering surface partial total reflection type Fresnel lens, and a first light diffusing part (a first light diffusing means) 26. This first light diffusing part 26 also has a function of bonding together the light entering surface partial total reflection type Fresnel lens 24 and the first base 25. The image display element 30 is comprised of a lens element 31 for providing at least an angle of diffusion for the image light so as to diffuse the image light, a second base 32 for holding this lens element 31, and second light diffusing parts (a second light diffusing means) 33 for forming the image light into an image. Because the image display element 30 is generally observed directly by the viewer 1, a surface-processed part 34 is disposed at a location in the image display element which is the nearest to the viewer 1 in this Embodiment 1. This surface-processed part 34 can be, for example, an antireflection layer for reducing reflection of light in order to reduce the influence of ambient light, an anti glare layer for reducing visual glare, an antistatic layer for preventing adhesion of dust due to static electricity, or a hard coating layer for protecting the surface of the image display element.

The surface-processed part 34 can be directly formed on a surface of the second base 32 on the side of the viewer. In this Embodiment 1, the surface-processed part 34 is formed on a third thin base 35, and the third thin base is bonded to the second base 32 by a first bonding layer 36. In this case, the first bonding layer 36 can contain a pigment, a dye, or the like which absorbs ambient light. The third thin base 35 is constructed using a base material which is shaped like a film and is made from a resin, e.g., PET (PolyEthylene Terephthalate) or TAC (TriAcetylCellulose).

The second base 32 is characterized in that the second base has a substrate made from a resin, such as PMMA (Poly Methyl MethAcrylate), MS (Methyl methacylate Styrene), MBS (Methyl methacylate Butadiene Styrene), or PC (Polycarbonate), and at least a plurality of second light diffusing parts 33 (in FIG. 1, two layers) are arranged discretely in one of two virtually-divided portions each having a thickness half that of the second base, which is closer to the viewer. When the second base 32 is formed, the second light diffusing parts 33 are incorporated into the second base in such a way that the second light diffusing parts are layered, and the second base and the second light diffusing parts are formed integrally. In a case in which the second base 32 is made from glass, the second light diffusing parts 33 each of which is shaped like a film can be bonded to the second base by bonding layers. The second light diffusing parts 33 are comprised of at least two layers, and the gap between any two adjacent ones of them is about one-tenth of the size of the projected pixels which construct the image projected onto the screen.

Figure 3:
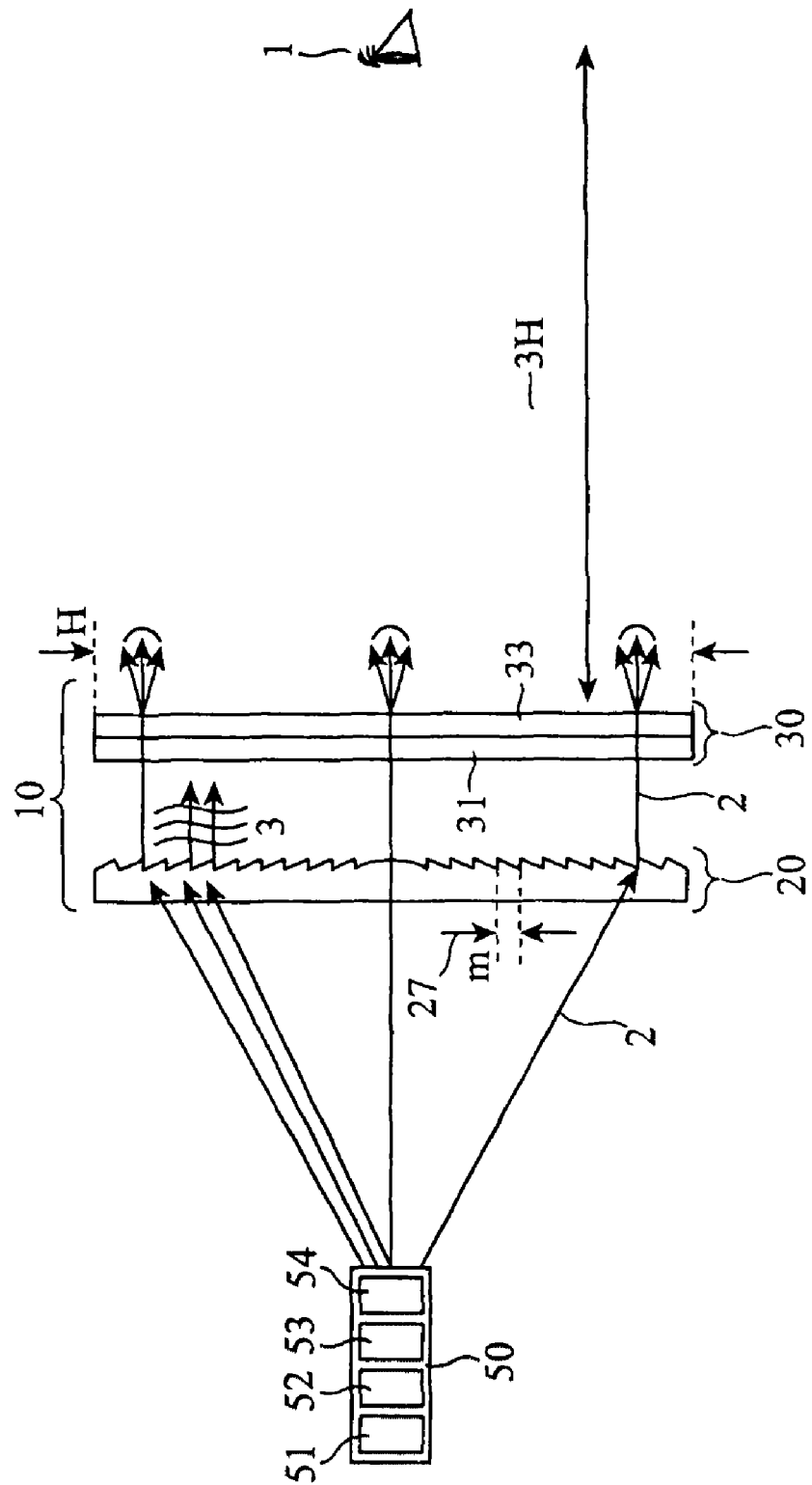
FIG. 3 is an explanatory drawing showing a relation between the transparent screen and projected pixels in accordance with Embodiment 1 of the present invention.

A relation between the screen and the projected pixels is schematically shown in FIG. 3. The projector 50 comprised of the light source 51, the illuminating optical system 52, the light valve 53, and the projection optical system 54 projects the image light 2 onto the transparent screen 10. When the height of the screen is expressed as H, the standard observation distance is three times as long as the height H. For example, assuming that the viewer's 1 eyesight is 1.0 and the height H is H=1.0 m, the viewer's resolution is about 1 mm. The size of 1 mm of the projected pixels is $1/1,000$th times the height of 1 m of the screen, and 1,080 which is the number of effective scanning lines of so-called HDTV (High Definition Television) is based on this relation. In this Embodiment 1, because it is assumed that the screen height satisfies the following inequality: 0.8 m<H<1.1 m, the following inequality: 0.7 mm<pixel size<1.0 mm is established. As shown in FIG. 3, the projection display device is comprised of the transparent screen 10 and the projector 50. In FIG. 3, reference numeral 27 shows the Fresnel prism pitch of a plurality of Fresnel prisms arranged in a sawtooth shape, and reference numeral 3 shows the wave front of the image light 2 emitted from the Fresnel lens screen 20.

Referring again to FIG. 1, the lens element 31 is provided with at least trapezoidally-shaped lenses 37 for diffusing the light from the light source into a solid angle, a light absorbing part 38 for absorbing the ambient light, and a fourth base 39 for holding this light absorbing part. In addition, assistant lenses 40 for assisting luminous intensity distribution control of the trapezoidally-shaped lenses 37 can be arranged on the surface of the lens element which is the closest to the light entering surface. Furthermore, the lens element 31 and the second base 32 are bonded together by a second bonding layer 41. In Embodiment 1, the lens element 31 comprised of the trapezoidally-shaped lenses 37, the light absorbing part 38, the fourth base 39, and the assistant lenses 40, which is the best modes, is explained, though a lens element of Embodiment 2 which will be mentioned below can be alternatively used.

In each of the second light diffusing parts 33, at least two types of particulates having different particle sizes are arranged distributedly in the medium thereof. Embodiment 1 which is the best mode is characterized in that a first type of particulates 42 have a particle size ranging from 10 to 20 times the wavelength $\lambda$ of certain light (about 5 µm to 11 µm), and a second type of particulates 43 have a particle size ranging from 50 to 100 times the wavelength $\lambda$ of the certain light (about 27 µm to 53 µm). In this case, it is assumed that $\lambda$ shows the typical wavelength (530 nm) of visible light. Embodiment 1 is further characterized in that the two or more types of particulates have a refractive index difference $\Delta n$ between themselves and the medium which falls within a range of $\Delta n<0.03$. Generally, since the second base 32 is made from a resin or glass, the refractive index n of the second base falls within a range represented by $1.4<n<1.7$. Therefore, it is assumed that the refractive index of each of at least the two types of particulates falls within a range which is shifted by ($\Delta n<0.03$) from that of the second base 32.

The transparent screen 10 which is constructed in this way can produce an image display having a high color temperature and a high degree of resolution while reducing the image degradation due to speckles. This advantage will be explained in detail hereafter.

Figure 4:
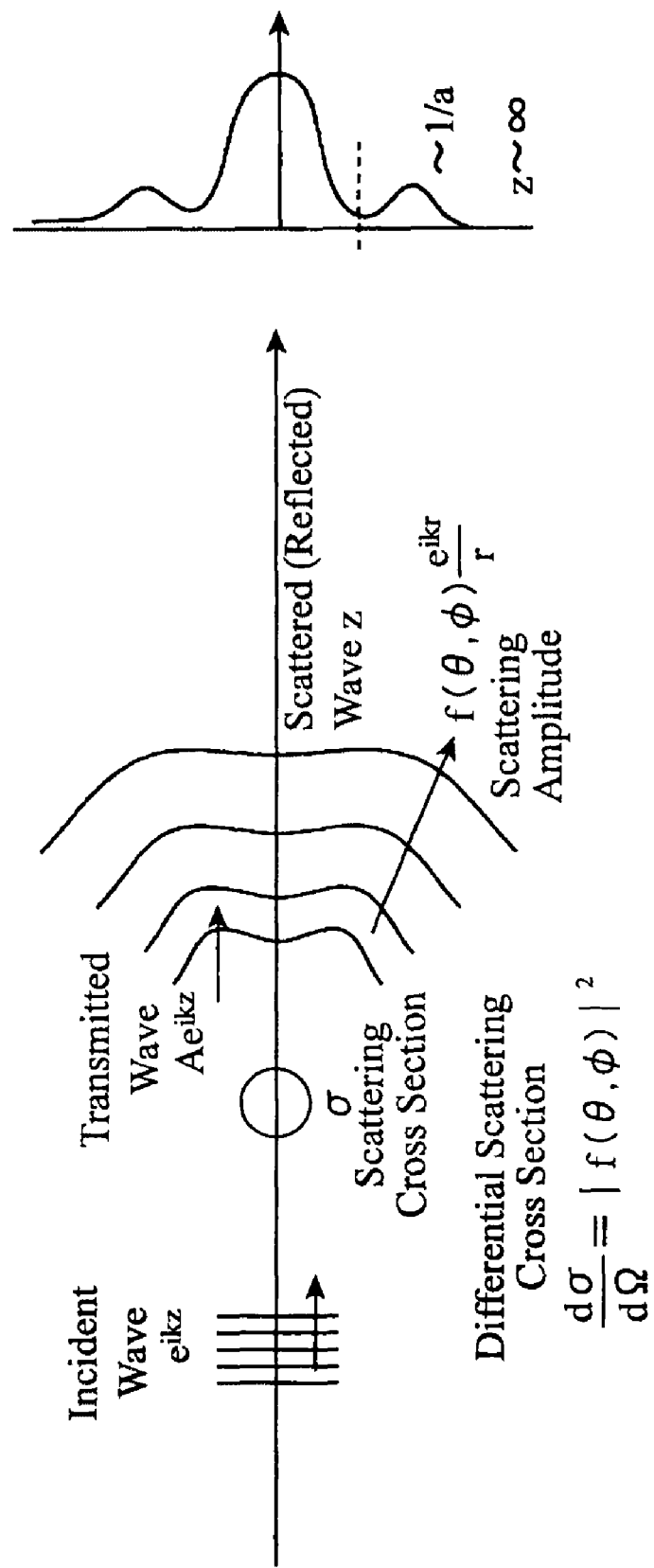
FIG. 4 is an explanatory drawing showing scattering of image light in the transparent screen in accordance with Embodiment 1 of the present invention.

First, scattering of the image light will be briefly explained. A scattering problem is that when an incident wave is applied to a particulate, as shown in FIG. 4, a transmitted wave and a scattered (reflected) wave appear (according to the law of energy conservation as long as there is no absorber). The amplitude of the scattered wave at that time (in FIG. 4, the scattered wave is illustrated with approximation of spherical waves) is called scattering amplitude, and the differential scattering cross section is determined from the angle characteristics of this amplitude. By integrating this differential scattering cross section over all the solid angle, the total scattering cross section is determined, and, as a matter of course, there is a correlation between the scattering cross section and the phase shift of the forward scattering wave (optical theorem). In the case of a classic scattering problem, this scattering cross section is expressed by $\pi a^2$ (where the radius of the particulate is expressed as a).

Hereafter, visible light (having a wavelength $\lambda$ ranging from 380 nm to 780 nm) is considered. Light is an electromagnetic wave and is a traverse wave according to the Maxwell's equation. The interaction of light wave with a particulate changes according to its wavelengths $\lambda$. The above-mentioned scattering problem is solved approximately, and shows that in a case in which the characteristic length l of the particulate ranges up to $0.01\lambda$, the light wave is not scattered (transparent), in a case in which the characteristic length l of the particulate satisfies $0.01\lambda<l<0.1\lambda$, the light wave is explained by the Rayleigh scattering theory, in a case in which the characteristic length l of the particulate satisfies $0.1\lambda<l<100\lambda$, the light wave is explained by the Mie scattering theory, and in a case in which the characteristic length l of the particulate satisfies $l>100\lambda$, the light wave is explained by geometrical optics, such as refraction or reflection. In the case of the Rayleigh scattering, the above-mentioned scattering cross section is in inverse proportion to the fourth power of the wavelength, whereas in the case of the Mie scattering, the scattering cross section has more complicated wavelength dependence. Because particulates smaller than the wavelength $\lambda$ are not handled in the present invention, the Rayleigh scattering will be not taken into consideration hereafter.

Now, it will be explained with reference to FIG. 4 that in a case in which the particle size of a particulate is small (in this case, 5 µm to 50 µm), light incident upon the particulate easily diffuses into a solid angle due to the scattering from the particulate. In a case in which, for example, a plane wave is incident upon an aperture having a radius a, because the diffusion of its wave front at a distant (z>1) which is enough far from the Fresnel-Kirchhoff diffraction integral can be approximated by Fraunhofer diffraction, it is known that the diffraction pattern is expressed by the Fourier transformation of the pupil function (aperture), and the diffusion of the diffraction pattern is proportional to the inverse number of the particle size a.

Furthermore, in a case in which the light has a wavelength which falls within the frequency range of visible light, because the smaller wavelength $\lambda$ the light has, the larger relative scattering cross section the light has, the shorter wavelength the light has (the more blue light), the light is scattered the more, and the longer wavelength the light has (the more red light), the light passes through the particulate the more easily without being scattered by the particulate. In addition, the refractive index n of a medium is related to the velocity of light passing through the medium, and the larger refractive index difference, the light is bent at the larger angle when entering the medium.

Hereafter, the coherence of light waves will be explained briefly. In general, coherence shows that light waves of light have a fixed relation in their phases and amplitudes. For example, the initial phases, the frequencies (spectrum), and the wave numbers (shows a direction because the wave number is a vector quantity) of light waves of light are handled collectively, and it is defined that a state in which these quantities (modes) are similar shows a high degree of coherence, whereas a state in which these modes are random shows a low degree of coherence. That is, light which consists of light waves having equal phases, light which consists of light waves having equal frequencies, and light which consists of light waves propagating in equal directions have a high degree of coherence. For example, because laser light consists of light waves having equal initial phases, having a narrow frequency range (having equal frequencies), and having a small diffusion (propagating in equal directions), the laser light has a high degree of coherence. On the contrary, because white light consists of light waves having random initial phases, having a wide frequency range (e.g., having a blackbody radiation spectrum), and having a large diffusion, the white light has a low degree of coherence (incoherent). As an index showing this coherence quantitatively, there is a complex degree of coherence, a degree of coherence in this specification shows a complex degree of coherence.

When the particle size of each particulate is made small or the refractive index difference is increased, like in the conventional cases, the incident light is made to diffuse easily into a solid angle due to the scattering from particulates, as mentioned above. As shown in the explanation of the coherence of light waves, the degree of glaring is reduced because the degree of coherence of diffused light waves becomes lower than that of the original light waves. However, because the wavelength dependence of the scattering becomes large relatively rather than before, as shown in the explanation of the relation between the wavelength $\lambda$ and the scattering, there is an adverse effect of making the tint be toward red. Especially, in the case of small-sized particulates, because the collision cross section is small, the light waves pass through the medium without being scattered by the medium unless the filling factor of the particulates is increased, and hence there is an adverse effect of increasing the degree of glare.

However, in the case in which large-sized particulates (=the second type of particulates 43) are added and mixed, like in the case of this Embodiment 1, such a large-sized particulate has an effect which is opposite to the effect produced by small-sized particulates (=the first type of particulates 42) upon light incident thereupon, and the wavelength dependence of the effect is relatively small. Therefore, scattered light which has a good tint (white) and which rarely go through the medium without being scattered can be acquired. That is, the large-sized particulates have an effect of compensating the problem caused by the small-sized particulates. Hereafter, the concrete sizes of the large-sized particulates and the small-sized particulates will be explained. The undulatory characteristics of light, such as scattering and diffraction, depend on the wavelength of the light and the length of an object with which the light interacts. The undulatory characteristics of light will be explained hereafter with reference to FIG. 5.

Figure 5:
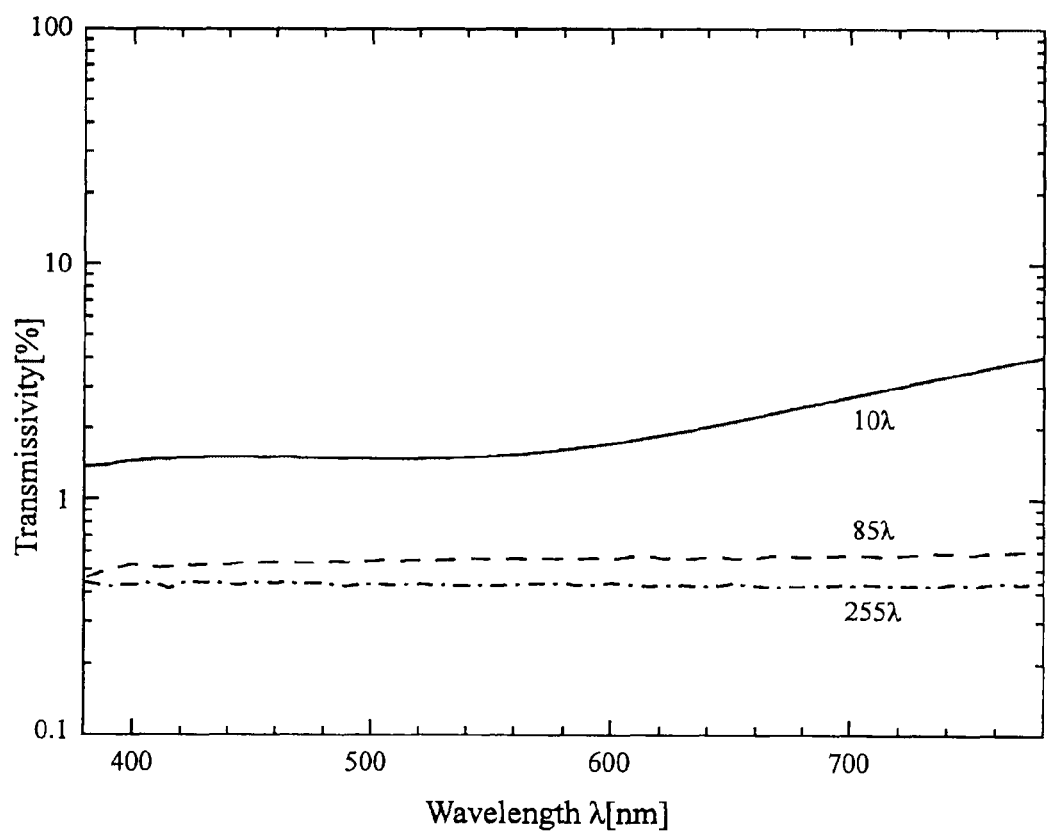
FIG. 5 is an explanatory drawing showing a relation between the wavelength of light and transmissivity for three different examples of the size of particulates for use in diffusing layers of the transparent screen in accordance with Embodiment 1 of the present invention.

FIG. 5 shows about the forward transmissivity of each of a plurality of structures (each of which is formed of a triangular prism having a similar figure) in which small-sized particulates having a characteristic length of $10\lambda$, small-sized particulates having a characteristic length of $85\lambda$, and small-sized particulates having a characteristic length of $255\lambda$ (where $\lambda$ is the typical wavelength (530 nm) of visible light) are included, respectively. It can be seen from the experimental fact that the structure including small-sized particulates of $10\lambda$ has a large degree of wavelength dependence, and exhibits large transmissivity (i.e., a large degree of penetration) especially at a long wavelength (red). Of course, the amount of light rays penetrating the medium can be reduced by increasing the filling factor of the small-sized particulates, though it cannot be overemphasized that there causes an adverse effect of increasing the degree of diffusion as a whole. That is, it is preferable to use $10\lambda$ as a lower limit of the size of particles which form a diffusion layer having a good tint. In contrast, it is seen from the experimental fact that any structure having small-sized particulates having a characteristic length>$85\lambda$ exhibits a small change in the tint. Because, as shown in the explanation of the relation between the characteristic length of the above-mentioned particulates and the scattering, the larger size each particulate has, light scattered by each particulate shows the larger geometrical optics (>$100\lambda$), there arises a problem that the shadows of particulates are made or spots are recognized the viewer's eyes. Therefore, it is preferable to use particulates whose size satisfies an upper limit of $85\lambda$ of particulate size. It is therefore preferable that the first type of particulates 42, which are suitable for diffusing light moderately, have a particle size ranging from $10\lambda$ to $20\lambda$ (about 5 µm to 11 µm) which is close to the above-mentioned lower limit, and the second type of particulates 43, which are suitable for maintaining the tint, have a particle size ranging from $50\lambda$ to $100\lambda$ (about 27 µm to 53 µm) which is close to the above-mentioned upper limit.

Figure 6:
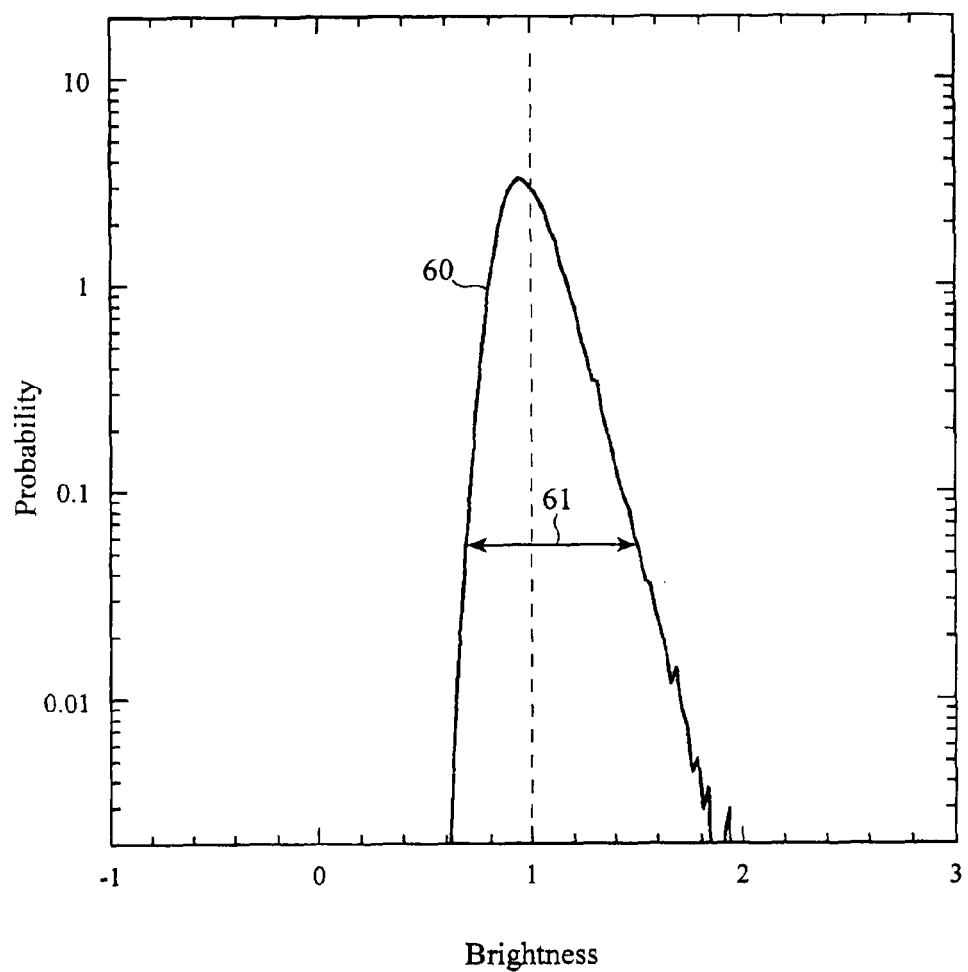
FIG. 6 is an explanatory drawing showing actual measurements of a probability density function in the transparent screen in accordance with Embodiment 1 of the present invention.
Figure 7:
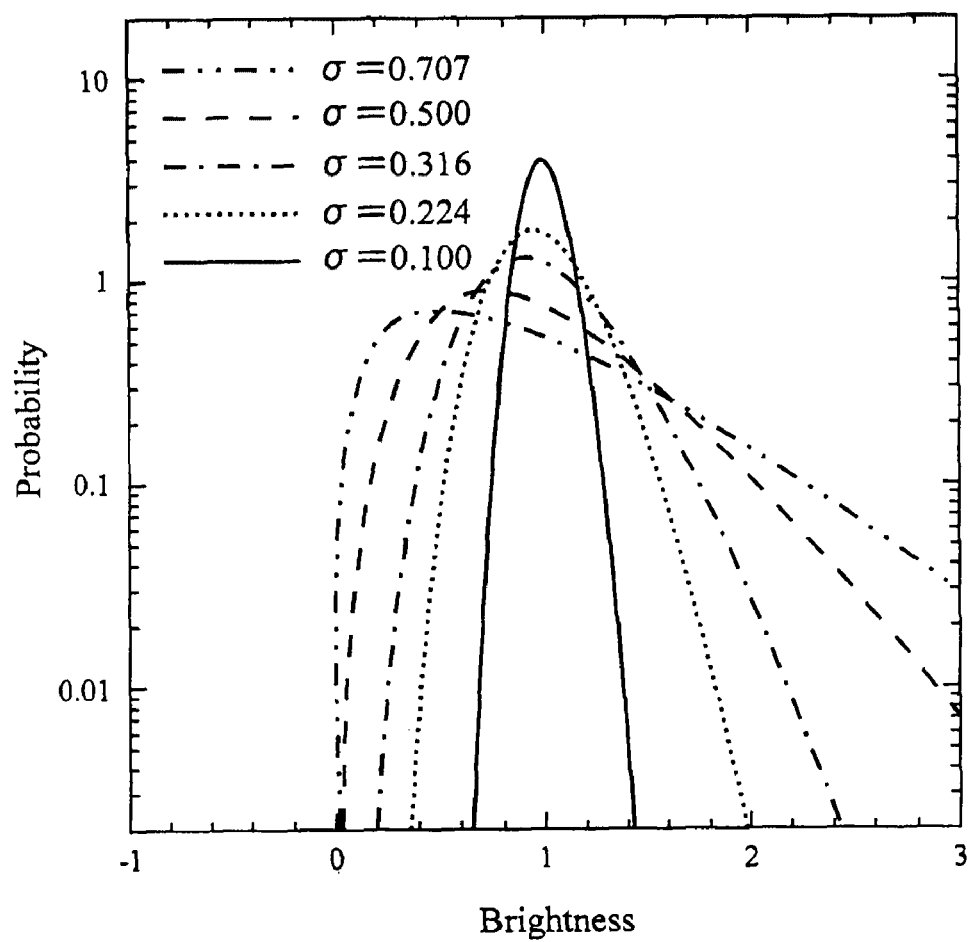
FIG. 7 is an explanatory drawing showing examples of the probability density function which are respectively computed for five different examples of speckle contrast in the transparent screen in accordance with Embodiment 1 of the present invention.

Next, reduction in the degree of glare which results from arrangement of the two types of particulates which are formed in this way will be explained. First, an index used for evaluating the degree of glare qualitatively will be explained, and then actual measurements will be explained. As the index used for evaluating the degree of glare qualitatively, speckle contrast is often used. The speckle contrast is a quantity which is defined by a ratio of the standard deviation of the brightness to the average brightness, and the quantity becomes large with increase in variations of the light and dark of the brightness (i.e., increase in the degree of glare). The speckle contrast can also be acquired from a probability density function (PDF) which is normalized with the average brightness. FIG. 6 shows an example of actual measurements of the probability density function 60, and the horizontal axis shows the brightness which is normalized with the average brightness (that is, 1 is the average brightness) and the vertical axis shows the probability. It is clear from the definition of the probability density function that by integrating the density of the probability, all the total probability, i.e., 1 is acquired. It is further clear from the definition that the speckle contrast 61 is the spread of this probability density function. FIG. 7 shows examples of the probability density function which are respectively computed in cases in which the speckle contrast σ=0.707, 0.500, 0.316, 0.224, and 0.100, and it can be seen from the figure that the narrower spread the distribution function has, the smaller the speckle contrast σ is.

Figure 8:
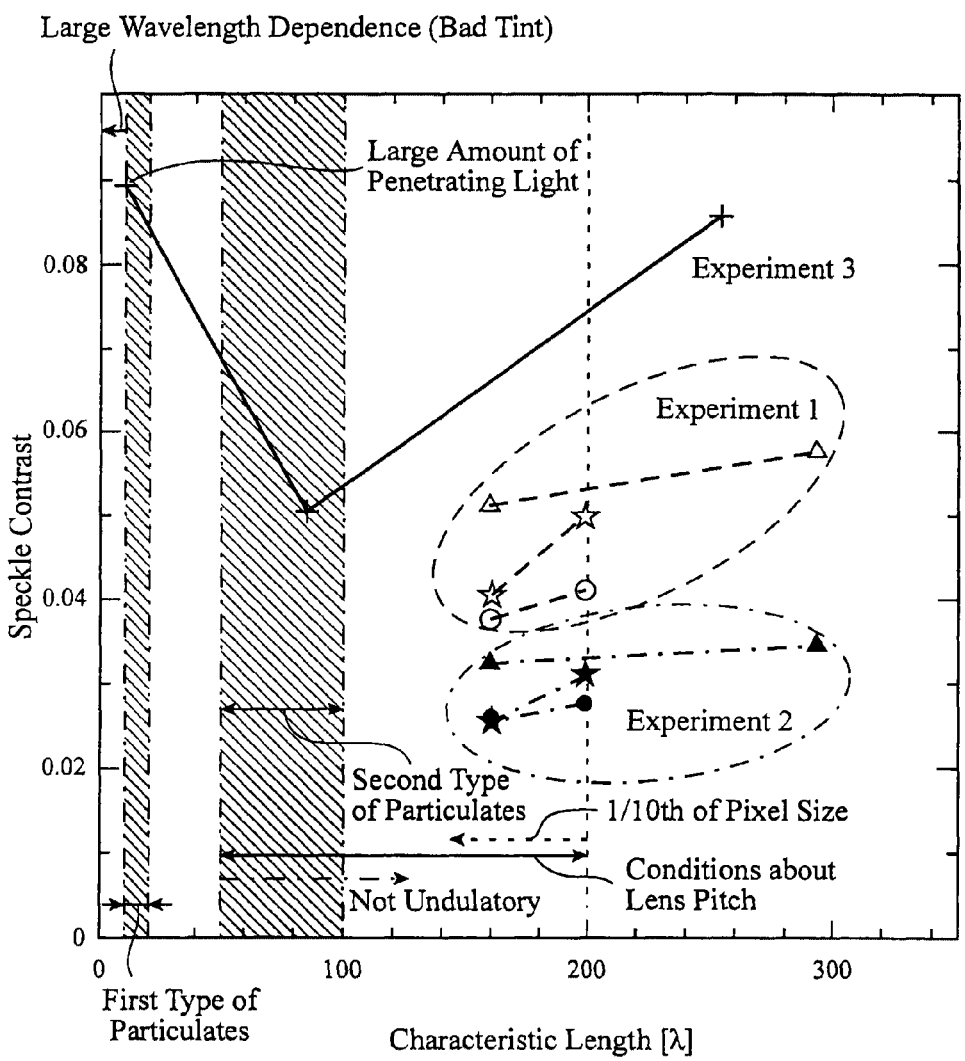
FIG. 8 is an explanatory drawing showing experimental results of a characteristic length and the speckle contrast in the transparent screen in accordance with Embodiment 1 of the present invention.

FIG. 8 is an explanatory drawing showing experimental results of the characteristic length and the speckle contrast. Experiment 3 of FIG. 8 shows actual measurements of the speckle contrast in a case in which partial coherent light is applied to each of a plurality of experimental structures (each of which is formed of a triangular prism having a similar figure) in which small-sized particulates having a characteristic length of 10λ, small-sized particulates having a characteristic length of 85λ, and small-sized particulates having a characteristic length of 255λ (where λ is the typical wavelength (530 nm) of visible light) are included, respectively. Although the smaller characteristic length, the smaller speckle contrast, the experimental results show that as the characteristic length is reduced to up to 10λ, the speckle contrast becomes larger on the contrary. This is because when the characteristic length is reduced to up to 10λ, the scattering cross section becomes small or the amount of zero-order diffracted light having undulatory characteristics increases, and therefore the amount of light rays penetrating the structure with the light waves having equal directions increases, and hence the degree of coherence of the illuminating light becomes high. Of course, as already explained, the amount of light rays penetrating the structure can be reduced by increasing the filling factor of the small-sized particulates, though there causes an adverse effect of causing degradation in the tint, and increasing the amount of diffusion to make the image become dark. Therefore, the first type of particulates which light can easily penetrate, but is made to diffuse largely when scattered thereby, and the second type of particulates which provide a good tint for the image and light cannot easily penetrate are formed and mixed in such a way that the first type of particulates have a particle size ranging from 10λ to 20λ (about 5 μm to 11 μm) and the second type of particulates have a particle size ranging from 50λ to 100λ (about 27 μm to 53 μm), as mentioned above.

Although a conventional technology of arranging diffusion layers in the screen in such a way that they are apart from one another can reduce the degree of glare surely, and can exert this effect enormously, the conventional technology causes a fatal problem of making the image become blurred. In Embodiment 1, the second light diffusing parts 33 comprised of at least two diffusion layers in each of which a plurality of particulates are distributed, and the gap between any two adjacent diffusion layers is about one-tenth of the size of the projected pixels which construct the image projected onto the screen. As already explained, the image projected onto the transparent screen 10 has the projected pixels as the smallest units thereof. In Embodiment 1, because it is assumed that the screen height H satisfies the following inequality: 0.8 m<H<1.1 m, the pixel size satisfies the following inequality: 0.7 mm<pixel size<1.0 mm. In a case in which the viewer's 1 eyesight is 1.0 and the screen height is H=1.0 m, because the viewer's resolution is about 1 mm, even if the size of the projected pixels is made to be finer than 1 mm, the viewer cannot recognize the image with a resolution of the order of the size of the projected pixels. That is, even if the image becomes blurred in a region thereof which is finer than the pixel size, it is difficult for the viewer to recognize the degradation in the image. For example, because the second light diffusing parts 33 of the second base 32 are arranged with the gap which is about one-tenth of the size of the projected pixels, the image becomes blurred at the light diffusing parts and the degree of coherence decreases, and hence the degree of glare is reduced, though there is provided an advantage of causing the viewer not to recognize the degradation in the image because the blurring applied to the image is limited to a region having a size smaller than the projection pixel size. That is, by causing the image to slightly appear blurred within the limits of the pixel size which is the smallest unit of the image, there is provided an advantage of causing the viewer not to recognize the degradation in the image and being able to reduce the degree of glare. From the above-mentioned reason, it is preferable that the second light diffusing parts 33 are comprised of at least two diffusion layers.

Furthermore, conventionally, it has been said that in order to reduce the degree of glare, it is preferable to cause the image to appear blurred by increasing the amount of diffusion by, for example, using particulates having a small particle size and a large refractive index difference, or increasing the gap between any two adjacent diffusion layers. In contrast, in accordance with Embodiment 1, the Fresnel lens which operates as a field lens for bending the light from the light source toward the viewer is used for the transparent screen. This Fresnel lens screen 20 has a function of collimating the light which diffuses from the light source to the image display element 30. That is, because the Fresnel lens does not contribute to the resolution of the image, the image does not become blurred even if, for example, the pitch of the lens is changed. However, in accordance with Embodiment 1, by adjusting this pitch of the Fresnel lens, the coherence of the light waves which illuminate the image display element 30 can be reduced and hence the degree of glare can be reduced.

Figure 9:
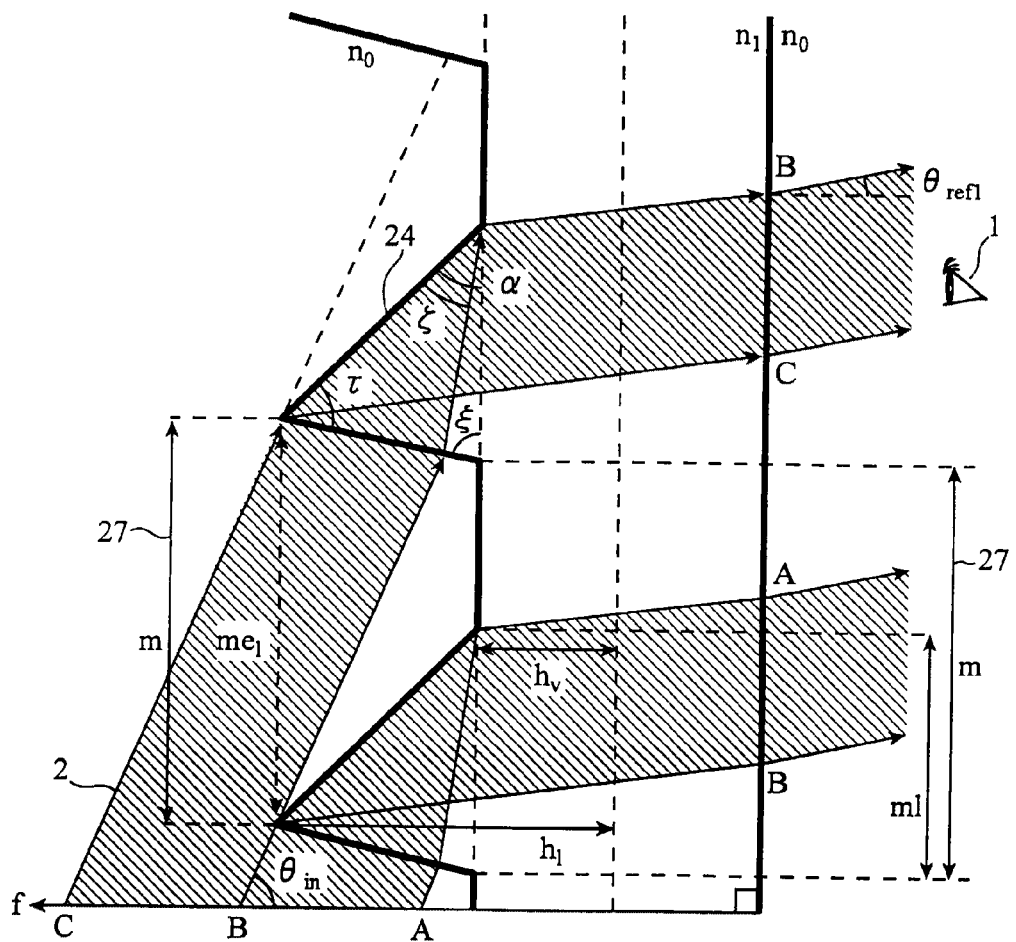
FIG. 9 is an enlarged view of a light entering surface partial total reflection type Fresnel lens in the transparent screen in accordance with Embodiment 1 of the present invention.

An example of Embodiment 1 will be explained with reference to FIG. 9. FIG. 9 is an enlarged view of the light entering surface partial total reflection type Fresnel lens 24, and each diagonally shaded portion shows the optical path of a signal light flux. The light entering surface partial total reflection type Fresnel lens 24 which is the best mode of Embodiment 1 is formed on the rear side surface of the Fresnel lens screen 20 as viewed from the viewer 1 (i.e., on the surface on a side of the light source). More specifically, this light entering surface partial total reflection type Fresnel lens 24 is a Fresnel optical element in which a plurality of Fresnel prisms are arranged in a sawtooth shape, each of the plurality of Fresnel prisms having a refractive surface for refracting a light ray emitted from the light emitting body, and a reflecting surface for reflecting the light ray refracted by the refractive surface, and a non-light incidence surface upon which a light ray emitted from the light emitting body is not incident directly because the light ray is blocked by a front Fresnel prism is formed in substantially parallel with the base surface on which the plurality of Fresnel prisms are arranged.

In this light entering surface partial total reflection type Fresnel lens 24, a flux of light which is refracted by light entering surfaces (refractive surfaces) and is then total-reflected by opposite slanting surfaces (reflecting surfaces) is made to exit toward the viewer 1. At that time, the continuous flux of light A-B-C is divided into two fluxes of light B-A and C-B. More specifically, because the wave front of the light incident upon the light entering surface partial total reflection type Fresnel lens is finely divided into a plurality of portions corresponding to the plurality of small apertures of the Fresnel lens, the smaller the Fresnel prism pitch 27 is reduced to, the more discontinuous the phases of the light waves have, and therefore the degree of coherence (spatial coherence) decreases indirectly. In general, in a case in which the plurality of apertures are small, the image becomes blurred irrespective of coherent illumination or incoherent illumination. The smallest unit which is the size of the projected pixels plays an important role also in this case, and, even if the image is made to become blurred in a region having a size finer than that of the projected pixels, the amount of degradation in the image can be reduced. That is, by causing the image to slightly appear blurred within the limits of the pixel size which is the smallest unit of the image, there is provided an advantage of causing the viewer not to recognize the degradation in the image and being able to reduce the degree of glare.

Although there is an issue of whether each of the plurality of apertures, i.e., the Fresnel prism pitch, can be reduced to infinitely small, the Fresnel prism pitch cannot be actually reduced to infinitely small. Because the Fresnel lens has periodicity, and therefore the Fresnel lens in which the plurality of Fresnel prisms are arranged periodically works as a diffraction grating if their pitch is reduced to about 10 times of the wavelength of the incident light, there arises a problem that the Fresnel lens exhibits large wavelength dependence. It is therefore preferable to make the pitch m of the Fresnel lens fall within a range: $>50\lambda$ ($>$about 27 µm) which makes the image have a small change in the tint and enables the incident light to have a geometry behavior, and be smaller than one-tenth (=100 µm: H=1 m) of the size (H/1,080) of the projected pixels, which cannot be recognized by the viewer.

Experiments 1 and 2 of FIG. 8 show results of measurements of the speckle contrast in a case in which partial coherent light is applied to combinations of experimental light entering surface partial total reflection type Fresnel lenses 24 having pitches of about 160$\lambda$, about 200$\lambda$, and about 290$\lambda$ and diffusing panels, respectively. In experiments 1 and 2, the same three types of experimental Fresnel lenses are used for the measurements of the speckle contrast while the illuminating conditions are changed. Each type of marks shown in the figure shows a group which was measured with the same illuminating condition so as to enable a paired comparison. It is experimentally shown that when at least the same illuminating condition is satisfied, the smaller characteristic length (Fresnel prism pitch), the smaller speckle contrast. It is also shown from the measurement results, as shown in experiment 3 of FIG. 8, of the speckle contrast in the case in which partial coherent light is applied to each of the plurality of triangular prisms having a similar figure that as the characteristic length becomes smaller within at least a range above 100$\lambda$, probably within a range above 50$\lambda$, the speckle contrast becomes smaller.

Figure 10:
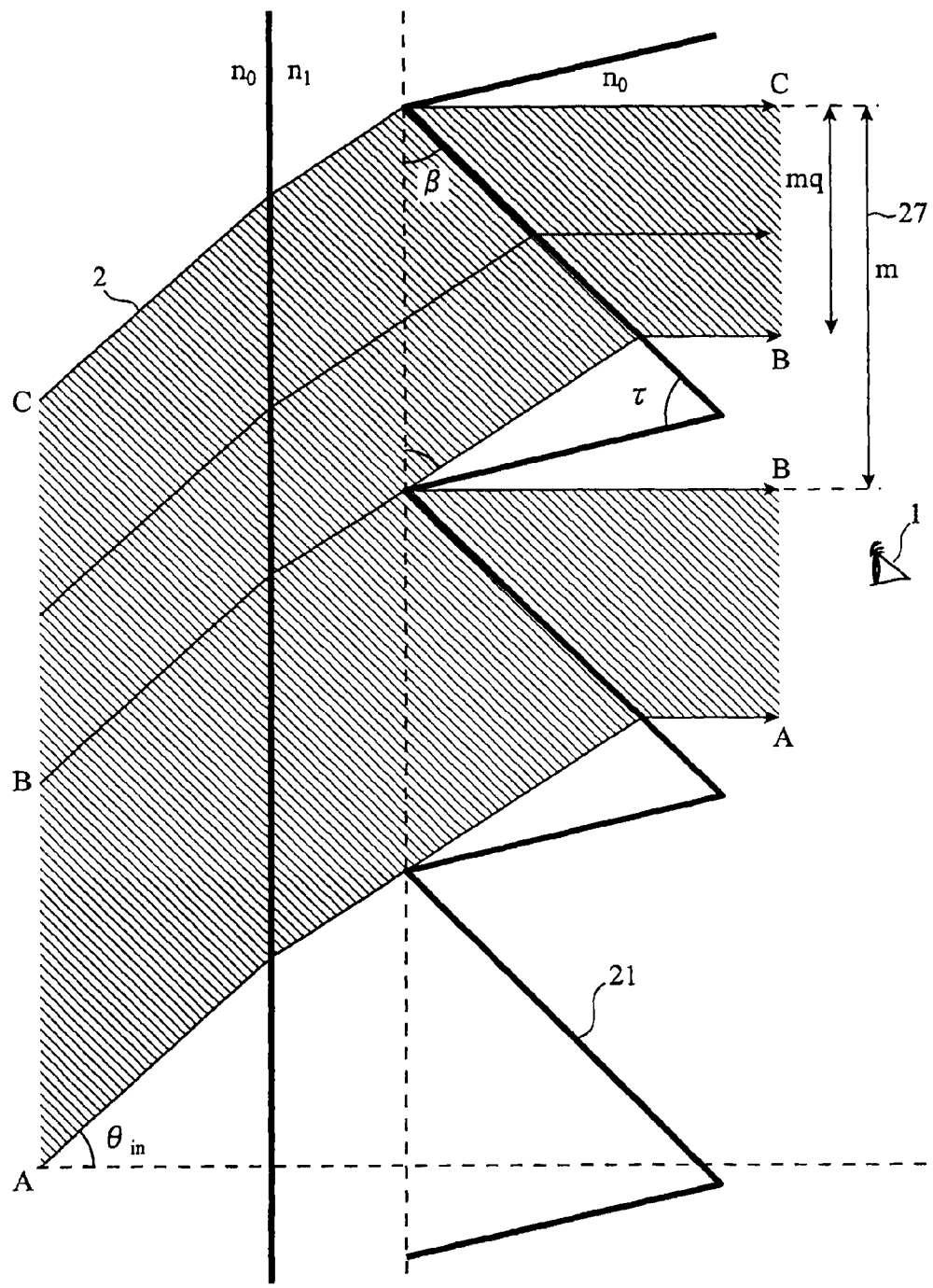
FIG. 10 is an enlarged view of a light exiting surface side refraction type Fresnel lens.
Figure 11:
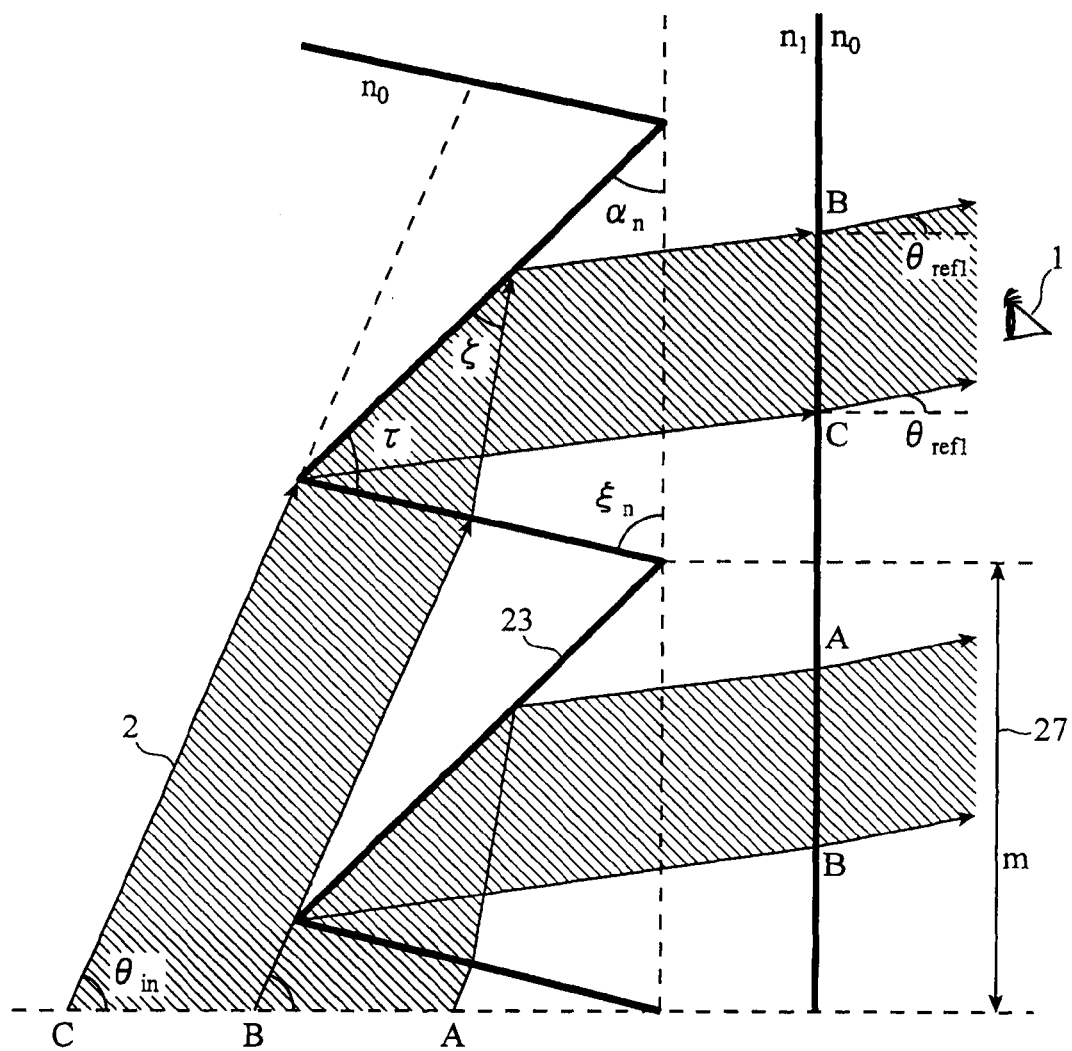
FIG. 11 is an enlarged view of a light entering surface side total reflection type Fresnel lens.

Furthermore, in accordance with Embodiment 1, the light entering surface partial total reflection type Fresnel lens 24 which is formed on the surface of the Fresnel lens screen on the side of the light source side which is opposite to the side of the viewer 1 (i.e., on the side of the light entering surface) is used. Hereafter, reduction of the degree of coherence which is caused by this structure will be explained. FIG. 10 is an enlarged view of a conventional light exiting surface side refraction type Fresnel lens 21, and FIG. 11 is an enlarged view of a light entering surface side total reflection type Fresnel lens 23. In these figure, each diagonally shaded portion shows the optical path of a signal light flux. FIG. 9 is an enlarged view of the light entering surface partial total reflection type Fresnel lens 24, as mentioned above. The conventional light exiting surface side refraction type Fresnel lens 21 is formed on a surface of a Fresnel lens screen on a side of a viewer 1. Assuming that a continuous flux of light A-B-C enters the screen from a surface on the other side opposite to the side of the viewer 1, the flux of light is bent toward the viewer by the Fresnel lens, and is made to exit from the light exiting surface side refraction type Fresnel lens. At that time, the flux of light is divided into two fluxes of light A-B and B-C. In contrast, in the light entering surface side total reflection type Fresnel lens 23 and the light entering surface partial total reflection type Fresnel lens 24, the flux of light A-B-C is divided into fluxes of light B-A and C-B. That is, the upper and lower sides of the flux of light are reversed inside the light entering surface side Fresnel lens, and the phase of the wave front is divided discontinuously. As can be seen from FIGS. 11 and 9, the light entering surface side total reflection type Fresnel lens 23 and the light entering surface partial total reflection type Fresnel lens 24 function in the same way as to reduction in the degree of coherence of the incident light, though the light entering surface partial total reflection type Fresnel lens 24 is adopted as the best mode of the present invention because the light entering surface partial total reflection type Fresnel lens 24 is superior to the light entering surface side total reflection type Fresnel lens 23 in respect of manufacturability, stray light, and so on. By thus adopting either the light entering surface side total reflection type Fresnel lens 23 or the light entering surface partial total reflection type Fresnel lens 24, because the upper and lower sides of the flux of light are reversed inside the Fresnel lens and the phase of the wave front is divided discontinuously, the spatial degree of coherence can be reduced indirectly.

As mentioned above, the transparent screen in accordance with Embodiment 1 including the Fresnel optical element having prisms formed on the side of the light entering surface thereof as viewed from the side of the light emitting body, the first base for holding the Fresnel optical element, and the second base for holding the lens element for providing an angle of diffusion for the image light emitted from the light emitting body so as to diffuse the image light, which are arranged in turn, is constructed in such a way that the first light diffusing means is disposed behind the Fresnel optical element and the second light diffusing means is disposed behind the second base, and there is a predetermined gap between the first light diffusing means and the second light diffusing means. Therefore, the transparent screen can produce an image display with a high color temperature and with a high degree of resolution while reducing the image degradation due to speckles.

Furthermore, in the transparent screen in accordance with Embodiment 1, the second light diffusing means has at least two types of particulates having different particle sizes and each having a refractive index difference $\Delta n$ between themselves and the medium of the second light diffusing means which satisfies $\Delta n<0.03$, and the first type of particulates have a particle size which falls within a range of 10 to 20 times as long as the typical light wavelength, and the second type of particulates have a particle size which falls within a range of 50 to 100 times as long as the typical light wavelength. Therefore, the degree of glare can be reduced without being recognized as degradation in the image.

In addition, in the transparent screen in accordance with Embodiment 1, the Fresnel optical element is constructed in such a way that the plurality of Fresnel prisms are arranged in a sawtooth shape, each of the plurality of Fresnel prisms having a refractive surface for refracting a light ray emitted from the light emitting body, and a reflecting surface for reflecting the light ray refracted by the refractive surface, and a non-light incidence surface upon which a light ray emitted from the light emitting body is not incident directly because the light ray is blocked by a front Fresnel prism is formed in substantially parallel with the base surface on which the plurality of Fresnel prisms are arranged. Therefore, the manufacturability of the transparent screen can be improved, and the transparent screen can be implemented superior to conventional transparent screens in respect of stray light and so on.

Furthermore, in the transparent screen in accordance with Embodiment 1, the plurality of Fresnel prisms of the Fresnel optical element are formed in such a way as to have a pitch longer than 50 times as long as the typical light wavelength and shorter than one-tenth of the size of the projected pixels. Therefore, the degree of glare can be reduced without being recognized as degradation in the image.

In addition, the projection display device in accordance with Embodiment 1 includes the transparent screen in accordance with any one of the above-mentioned aspects of the present embodiment, and the light emitting body for applying the image light to the transparent screen. Therefore, the projection display device can produce an image display with a high color temperature and with a high degree of resolution while reducing the image degradation due to speckles.

Furthermore, the image display method in accordance with Embodiment 1 includes the step of: using the transparent screen in which the Fresnel optical element having prisms formed on the side of the light entering surface side thereof as viewed from the side of the light emitting body, the first base for holding the Fresnel optical element, and the second base for holding the lens element for providing an angle of diffusion for image light emitted from the light emitting body so as to diffuse the image light are arranged in turn, and the first light diffusing means is disposed behind the Fresnel optical element and the second light diffusing means is disposed behind the second base, so as to blur at least either of image light emitted from the first light diffusing means and image light emitted from the second light diffusing means within limits of the size of the projected pixels. Therefore, the use of the image display method makes it possible to produce an image display with a high color temperature and with a high degree of resolution while reducing the image degradation due to speckles.

Embodiment 2

Figure 12:
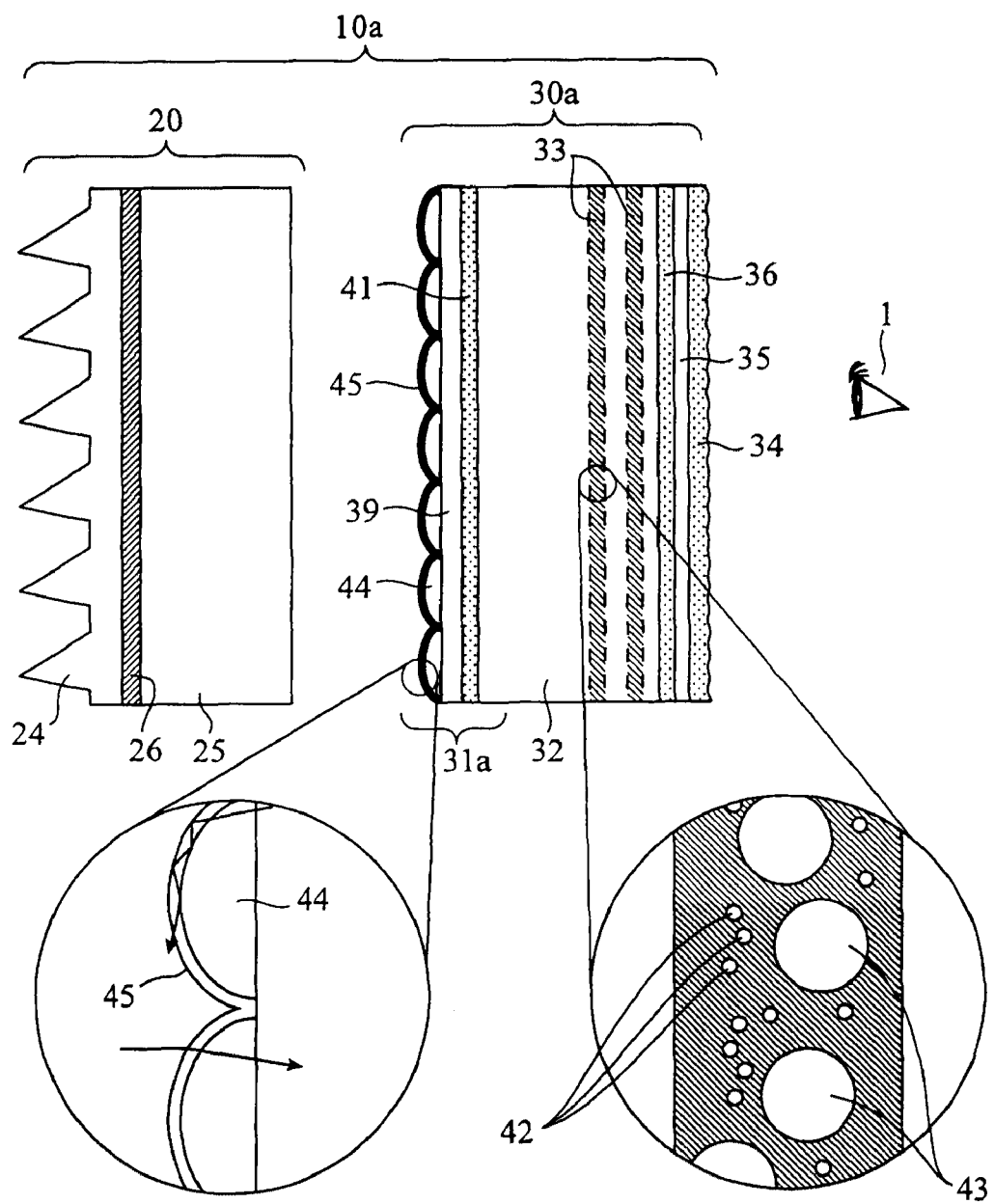
FIG. 12 is a block diagram showing a transparent screen in accordance with Embodiment 2 of the present invention.

FIG. 12 is a block diagram showing a transparent screen 10a in accordance with Embodiment 2. In Embodiment 1, the lens element 31 is comprised of the trapezoidally-shaped lenses 37, the light absorbing part 38, the fourth base 39, and the assistant lenses 40. As shown in FIG. 12, the lens element 31 can be alternatively comprised of ellipse-shaped lenses 44, the fourth base 39 for holding the ellipse-shaped lenses, and a light absorbing part 45, and this structure will be explained as Embodiment 2. Because the other structural components of the transparent screen in accordance with Embodiment 2 are the same as those in accordance with Embodiment 1 shown in FIG. 1, the same components are designated by the same reference numerals as those shown in the figure and the explanation of the components will be omitted hereafter.

In accordance with Embodiment 2, the light absorbing part 45 uses the refractive index difference (Δn is about 0.5) between itself and the atmosphere so as to absorb a small amount of image light from the Fresnel lens screen 20 (by shortening the optical path in the light absorbing part 45 which the image light passes), whereas to absorb a large amount of ambient light (by lengthening the optical path length in the light absorbing part 45 which the ambient light passes). Because in the case in which the lens element 31a is constructed in this way, the structure of the lens element 31a is simplified, there is provided an advantage of improving the yield and so on.

Embodiment 3

Figure 13:
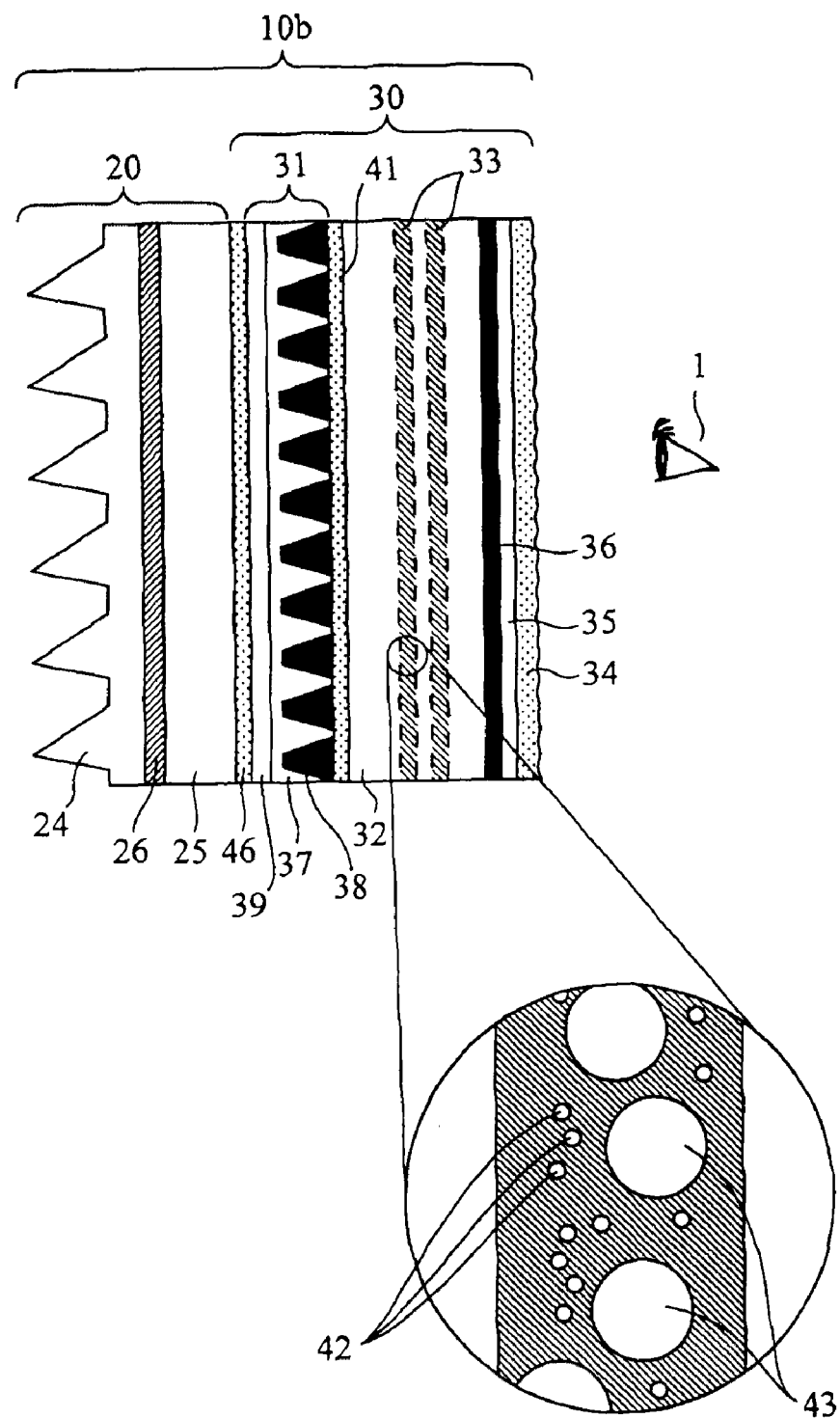
FIG. 13 is a block diagram showing a transparent screen in accordance with Embodiment 3 of the present invention.

FIG. 13 is a block diagram showing a transparent screen 10b in accordance with Embodiment 2. In Embodiment 1, the Fresnel lens screen 20 and the image display element 30 are arranged in such a way that they are apart from each other. As an alternative, they can be bonded together via a third bonding layer 46, as shown in FIG. 13, and this structure will be explained as Embodiment 3. Because the other structural components of the transparent screen in accordance with Embodiment 3 are the same as those in accordance with Embodiment 1 shown in FIG. 1, the same components are designated by the same reference numerals as those shown in the figure and the explanation of the components will be omitted hereafter. In this case, the assistant lenses 40 used in Embodiment 1 can be removed. The illustrated example shows this variant.

In accordance with Embodiment 3, because the transparent screen is constructed in such a way that the Fresnel lens screen 20 and the image display element 30 are bonded together via the third bonding layer 46, the thickness of the combination of the Fresnel lens screen 20 and the image display element 30 is, as a matter of course, larger than that of each of them, and therefore the transparent screen has an advantage of becoming hard to bend.

Embodiment 4

Figure 14:
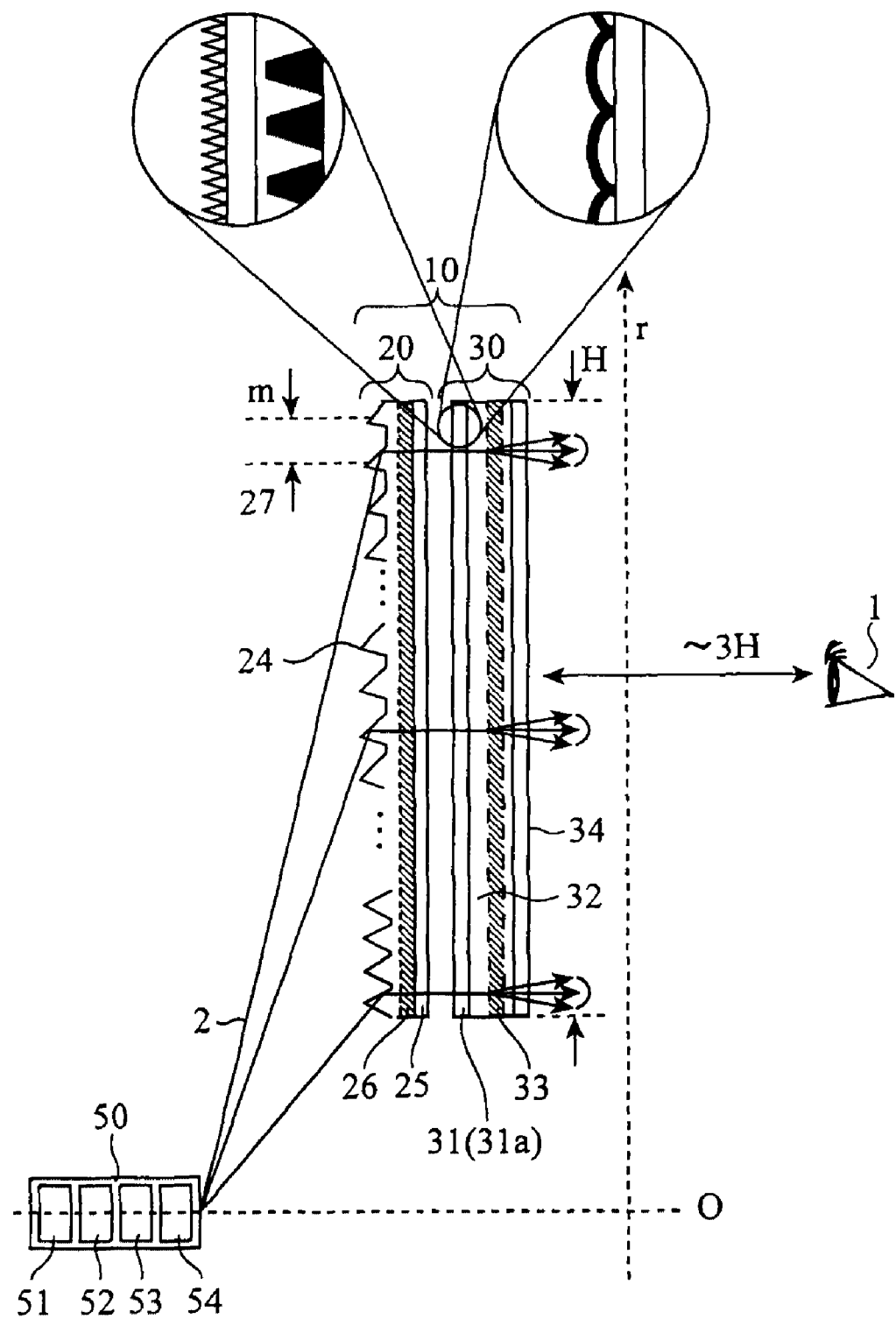
FIG. 14 is a configuration diagram showing a transparent screen in accordance with Embodiment 4 of the present invention.

FIG. 14 is a configuration diagram showing a projection display device in accordance with Embodiment 4. In the example of Embodiment 1, the plurality of Fresnel prisms of the Fresnel optical element are formed in such a way as to have a pitch longer than 50 times as long as the light wavelength λ and shorter than one-tenth of the size of the projected pixels. As a result, in accordance with Embodiment 1, the degree of glare can be reduced without being recognized as degradation in the image. Furthermore, by adjusting the lens pitch of the lenses included in the lens element of the image display element 30 to an optimal value, a much larger advantage can be provided. More specifically, the plurality of Fresnel prisms of a Fresnel optical element in accordance with Embodiment 4 are formed in such a way as to have a pitch longer than 50 times as long as the light wavelength λ and shorter than one-tenth of the size of the projected pixels, and the plurality of lenses of the lens element are formed in such a way as to have a lens pitch longer than 10 times as long as the light wavelength λ and shorter than one-tenth of the size of the projected pixels. In this case, the lens element can be either a lens element 31 having a plurality of trapezoidally-shaped lenses 37 as explained in Embodiment 1 or a lens element 31a having a plurality of ellipse-shaped lenses 44 as explained in Embodiment 2 as long as the lens element has periodicity. Although it is needless to say that it is still preferable that the particulates included in a second light diffusing part 33 are based on Embodiment 1, any specifications about the particulates are provided in this embodiment. In FIG. 14, because the other structural components are the same as those shown in either of Embodiments 1 to 3, the corresponding components are designated by the same reference numerals and the explanation of these components will be omitted hereafter.

Figure 15:
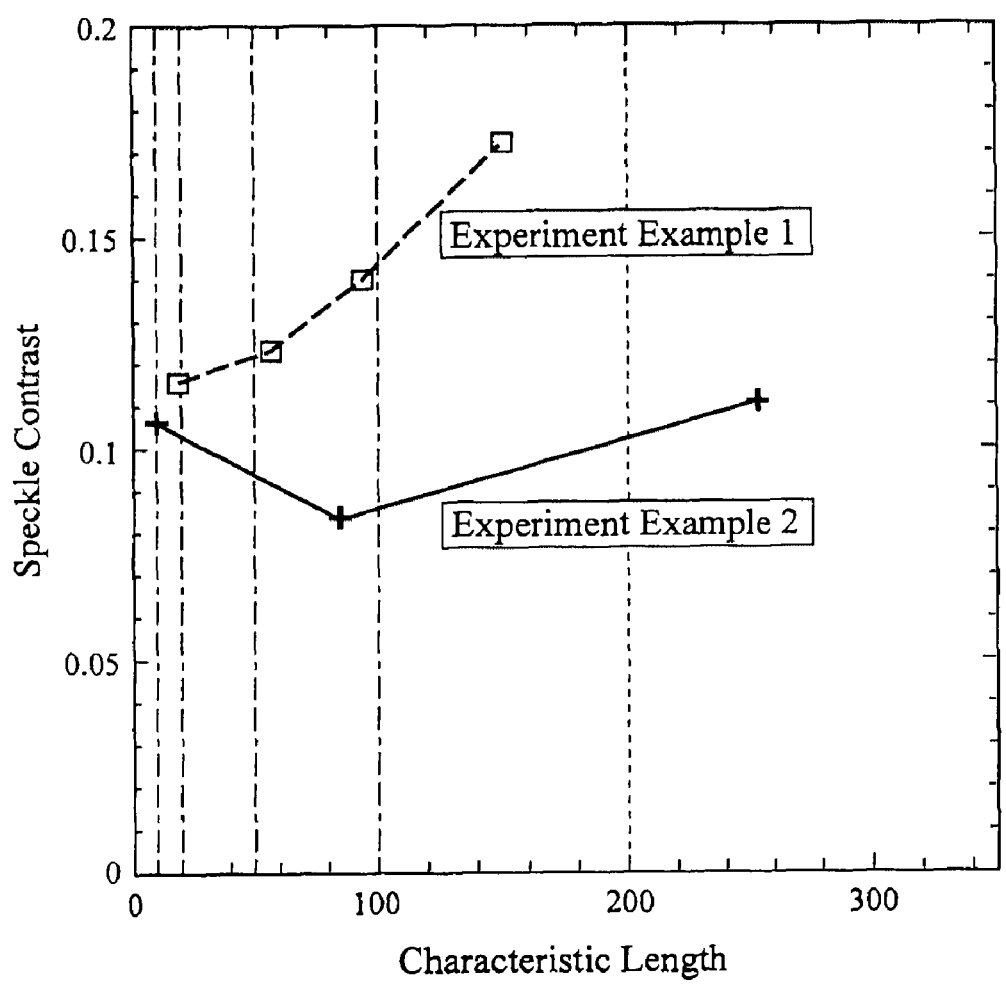
FIG. 15 is an explanatory drawing showing a relationship between a pitch and a speckle contrast in the transparent screen in accordance with Embodiment 4 of the present invention.

Hereafter, attention will be focused on the periodical structure of the lens element 31 (31a). Any experimental measurement results show that an example of the lens element 31 (31a) having a small pitch exhibits a smaller speckle contrast than that exhibited by another example of the lens element 31 having a larger pitch. FIG. 15 is a view showing a relationship between the pitch and the speckle contrast. In the figure, values each denoted by □ show actual measurements of the speckle contrast which are obtained by applying coherent light to a combination of each of actually-prototyped structures (each of which consists of triangular prisms having a similar figure) having characteristic lengths of about 20λ, 55λ, 95λ, and 150λ respectively (where λ shows a typical wavelength (530 nm) of visible light), and a diffuser panel having a mat surface. Furthermore, values each denoted by + in the figure similarly show actual measurements of the speckle contrast which are obtained by applying coherent light to a combination of each of actually-prototyped structures having characteristic lengths of about 10λ, 85λ, and 255λ respectively, and a diffuser panel having a mat surface. □ in the figure show the values in a case in which each of the structures has a ratio of its height to its pitch is 25:2, and this case will be referred to as experiment example 1 hereafter. Furthermore, + in the figure show the values in a case in which each of the structures has a ratio of its height to its pitch is 9:2, and this case will be referred to as experiment example 2 hereafter.

It can be seen from FIG. 15 that in both the cases □ and +, the shorter characteristic length the structure has, the smaller speckle contrast is shown. However, in a case in which the characteristic length of the structure is reduced to 10λ, as shown by + in the figure, the amount of zero-order diffracted light having undulatory characteristics increases, and therefore the amount of light rays penetrating the structure with the light waves having equal directions increases, and hence the degree of coherence of the light becomes high and the speckle contrast increases. In a phenomenon of diffraction of light by the lenses included in the structure, the pitch of the lenses of the structure imposes an influence upon the direction of the diffraction, and the height of the structure imposes an influence upon the efficiency (the reflectivity or the transmissivity). A case in which the height of the structure is reduced to its lower limit of 0 is equivalent to a case in which there is no structure, no diffraction of the light by the structure occurs. Because the heights of the examples of the structure in experiment example 1 (□ in the figure) are low relative to those in experiment example 2 (+ in the figure), it can be considered that the efficiency of diffraction in experiment example 1 is also low relative to that in experiment example 2. That is, it can be considered that because the examples of the structure in experiment example 1 (□ in the figure) cannot be easily affected by the undulations of light as compared with the examples of the structure in experiment example 2 (+ in the figure), and therefore the occurrence of zero-order diffracted light having undulatory characteristics, i.e. light rays penetrating the structure with the light waves having equal directions decreases relatively in experiment example 1, the degree of coherence does not increase, and, even if the pitch is reduced to 20λ, the speckle contrast is kept small in experiment example 1.

In summary, although it is shown experimentally that an example of the lens element 31 (31a) having a smaller pitch exhibits a smaller speckle contrast than that having a larger pitch, the pitch which reduces the speckle contrast to a minimum is dependent upon the aspect ratio of the structure, and, even if the structure is affected by the undulations of light, the structure has to have a lens pitch that falls within a small range, i.e. that is at least larger than 10λ. That is, it is preferable that the structure has to have a lens pitch shorter than one-tenth of the size of the projected pixels and longer than 10λ.

Figure 16:
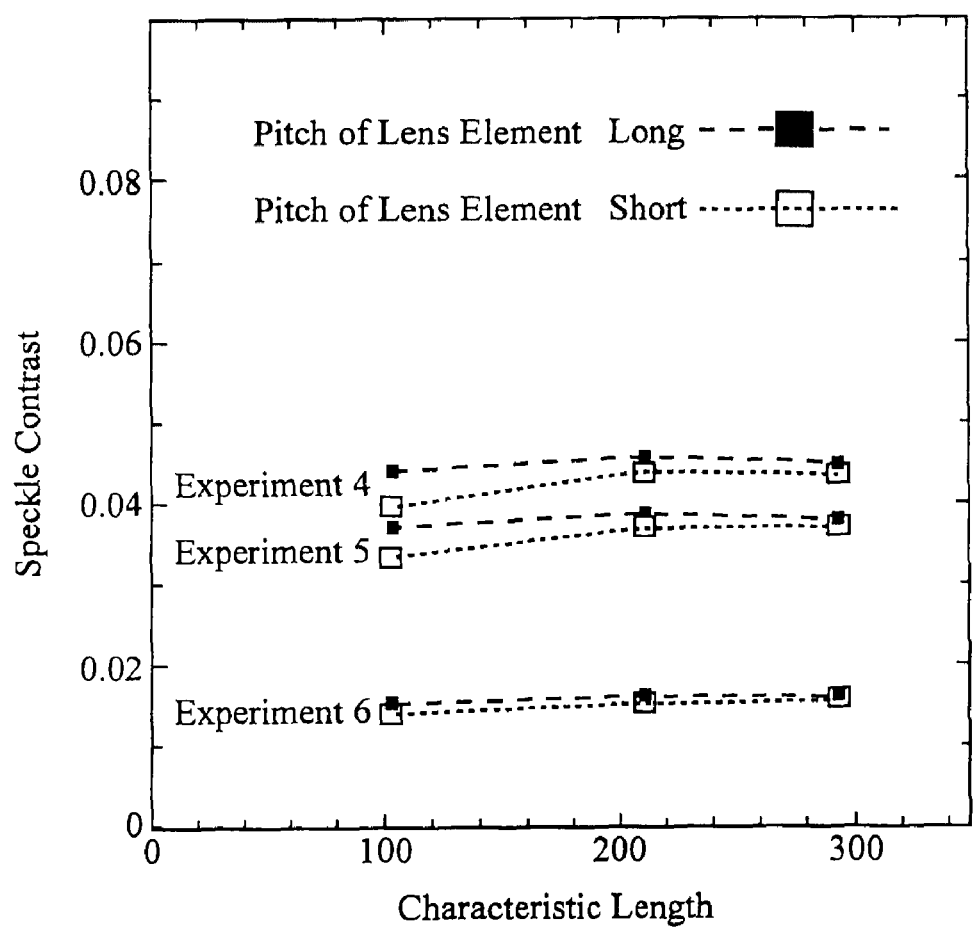
FIG. 16 is an explanatory drawing showing a relationship between a Fresnel prism pitch and the speckle contrast for every pitch of a lens element in the transparent screen in accordance with Embodiment 4 of the present invention.

Hereafter, attention will be focused on a combination of the Fresnel prism pitch of the Fresnel optical element and the periodical structure of the lens element 31 (31a). FIG. 16 is a view showing a relationship between the Fresnel prism pitch and the speckle contrast according to the pitch of the plurality of lenses of the lens element. Experiments 4, 5, and 6 shown in the figure show measurement results of the speckle contrast in a case in which a combination of each of actually-prototyped examples of light entering surface partial total reflection type Fresnel lenses 24, the examples having pitches of 105λ, 210λ, and 290λ respectively, and an image display element 30 is illuminated with partial coherent light. In experiments 4, 5, and 6, the measurement results of the speckle contrast of an identical prototype which were obtained with the exposing conditions being changed are shown. The horizontal axis in the figure shows the Fresnel prism pitch of the Fresnel optical element (the pitch of the light entering surface partial total reflection type Fresnel lenses 24), and the vertical axis shows the speckle contrast. ■ in the figure show the measurement results of combinations in each of which the lens element 31 (31a) having a relatively long pitch (about 122λ) is combined, and □ in the figure show the measurement results of combinations in each of which the lens element 31 (31a) having a relatively short pitch (about 85λ) is combined. It can be seen from the figure that the speckle contrast becomes small as the pitch of the plurality of Fresnel prisms of the Fresnel optical element becomes short, and the speckle contrast becomes small as the pitch of the plurality of lenses of the lens element 31 (31a) becomes short.

More specifically, a combination of the advantage provided by the limitations imposed on the Fresnel prism pitch of the Fresnel optical element and the advantage provided by the limitations imposed on the periodical structure of the lens element 31 (31a) provides a further advantage. In Embodiment 1, the plurality of Fresnel prisms of the Fresnel optical element are formed in such a way as to have a pitch longer than 50 times as long as the light wavelength λ and shorter than one-tenth of the size of the projected pixels. In Embodiment 4, because the plurality of lenses of the lens element 31 (31a) are formed in such a way as to have a pitch longer than 10λ and shorter than one-tenth of the size of the projected pixels, the speckle contrast can be reduced to a smaller one and the degree of glare can be further reduced.

Figure 17:
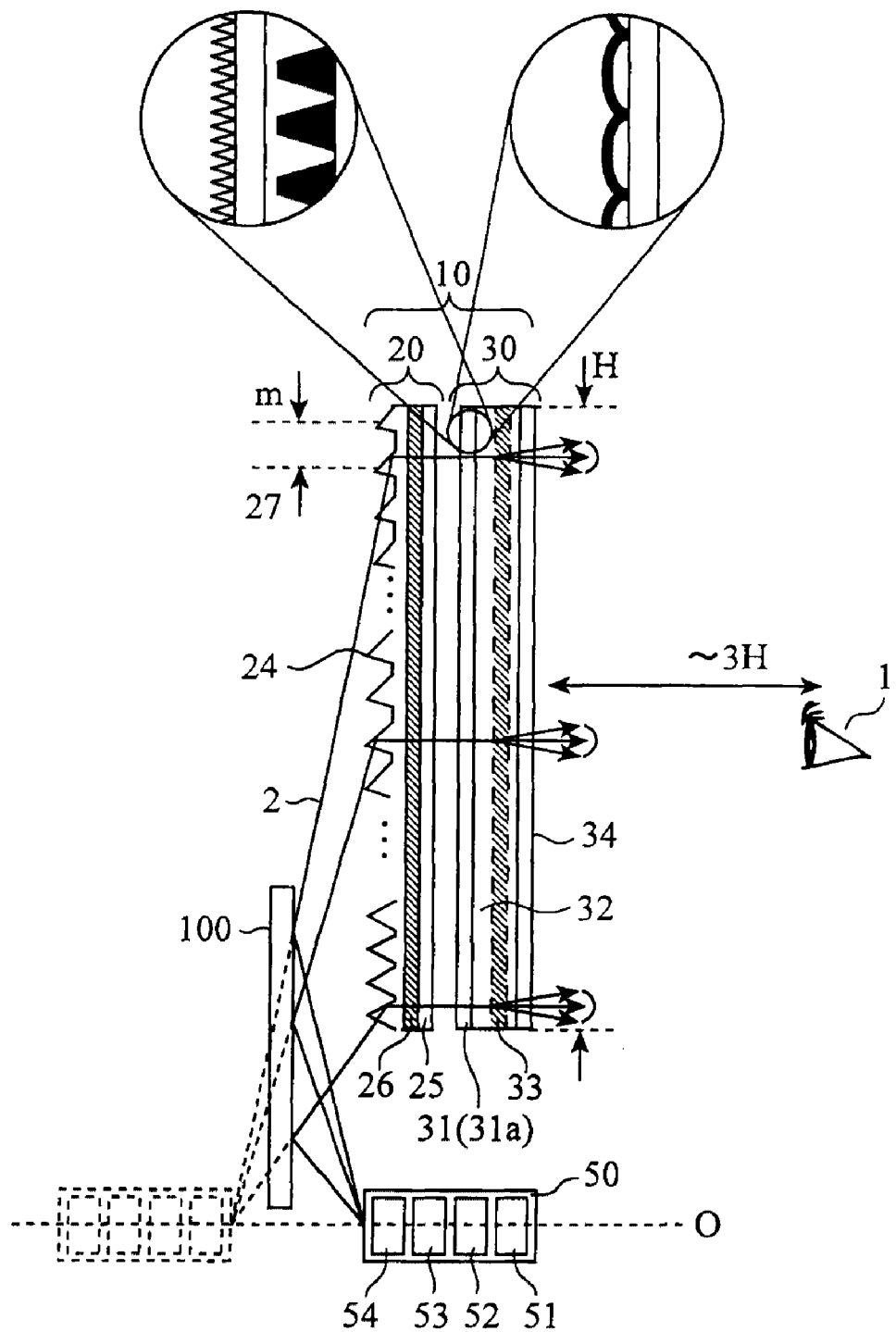
FIG. 17 is a configuration diagram showing a variant (a first variant) of the transparent screen in accordance with Embodiment 4 of the present invention.
Figure 18:
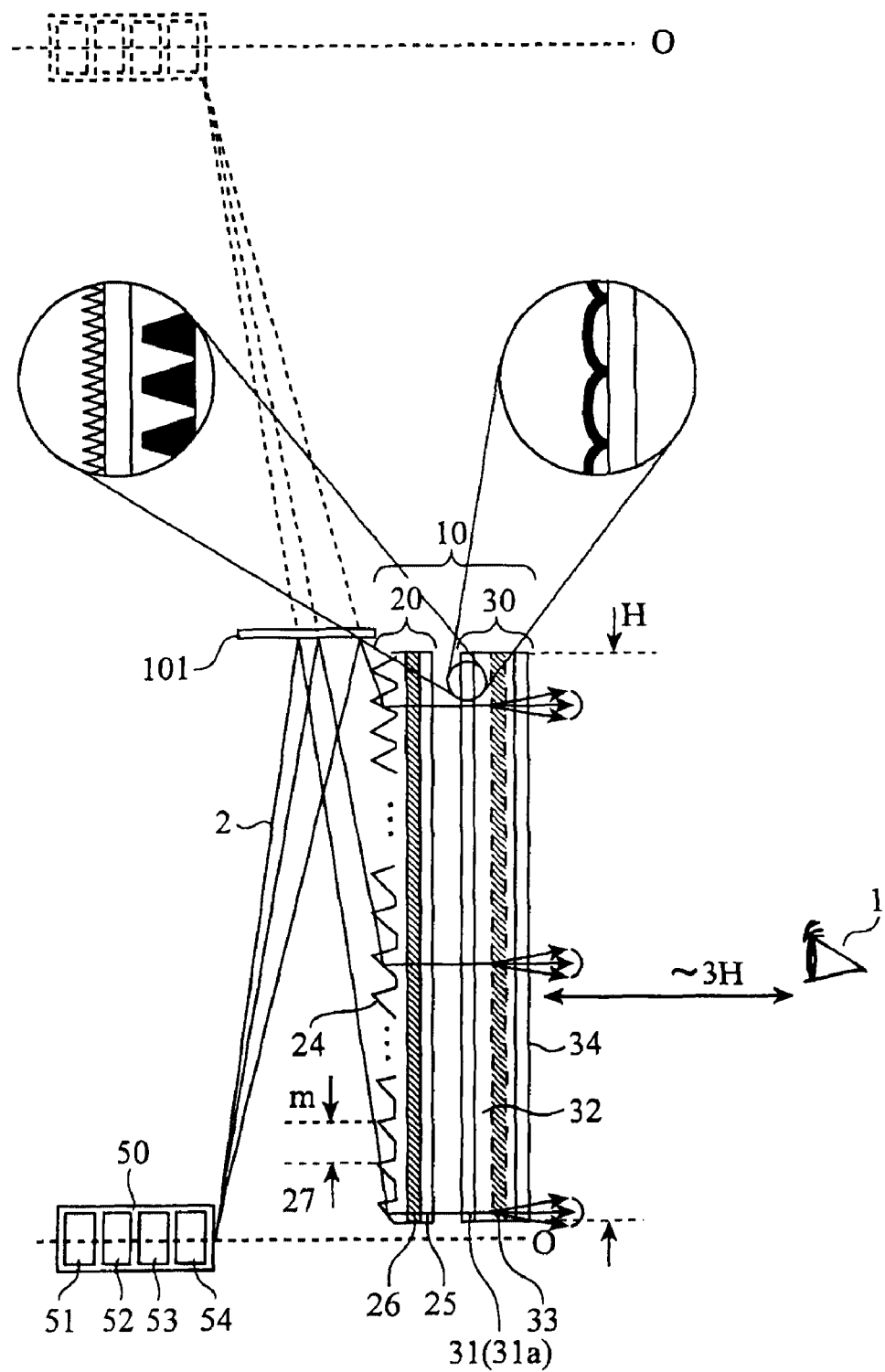
FIG. 18 is a configuration diagram showing a variant (a second variant) of the transparent screen in accordance with Embodiment 4 of the present invention.

FIG. 17 shows an example in which a reflector 100 is placed on an optical path between the projector 50 and the transparent screen 10 in the projection display device as shown in FIG. 14, and this reflector 100 is aligned in such a way as to be approximately parallel to the transparent screen 10. Because the other structural components are the same as those shown in FIG. 14, the explanation of the other components will be omitted hereafter. FIG. 18 shows another example in which a reflector 101 is similarly arranged in such a way as to be approximately perpendicular to the transparent screen 10. Also in the other example shown in FIG. 18, the other structural components are the same as those shown in FIG. 14. In the structures shown in these FIGS. 17 and 18, image light incident upon the transparent screen 10 is equivalent to image light from a projector 50 shown by a dashed line in each of the figures in a case in which there is no reflector 100 (101). In addition, two or more reflectors 100 or 101 can be disposed on the optical path in each of the structures of FIGS. 17 and 18. Furthermore, the transparent screen 10 can have the same structure as that shown in Embodiment 3 in each of the structures of FIGS. 17 and 18.

As mentioned above, in the transparent screen in accordance with Embodiment 4, because the plurality of Fresnel prisms of the Fresnel optical element are formed in such a way as to have a pitch longer than 50 times as long as a typical light wavelength λ and shorter than one-tenth of the size of the projected pixels, and the plurality of lenses of the lens element are formed in such a way as to have a pitch longer than 10 times as long as the light wavelength λ and shorter than one-tenth of the size of the projected pixels, the speckle contrast can be reduced to a smaller one and the degree of glare can be further reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A transparent screen comprising:
a Fresnel optical element having prisms which are formed on a side of a light entering surface side thereof as viewed from a side of a light emitting body;
a first base for holding said Fresnel optical element;
a second base that holds a lens element that provides an angle of diffusion for image light emitted from said light emitting body and transmitted through the Fresnel optical element to diffuse said image light;
a first light diffusing element disposed behind said Fresnel optical element; and
a second light diffusing element disposed behind said second base including at least two light diffusing layers,
wherein a predetermined gap is provided between said first light diffusing element and said second light diffusing element, and a bonding layer bonds the lens element to the second base, the bonding layer being separate from the second light diffusing element.

2. The transparent screen according to claim 1, wherein said second light diffusing element includes at least two types of particulates having different particle sizes and each having a refractive index difference Δn between themselves and a medium of said second light diffusing element which satisfies Δn <0.03, and a first type of particulates included in said at least two types of particulates has a particle size which falls within a range of 10 to 20 times as long as a typical light wavelength, and a second type of particulates included in said at least two types of particulates has a particle size which falls within a range of 50 to 100 times as long as the typical light wavelength.

3. The transparent screen according to claim 2, wherein in said Fresnel optical element, a plurality of Fresnel prisms are arranged in a sawtooth shape, each of said plurality of Fresnel prisms having a refractive surface for refracting a light ray emitted from the light emitting body, and a reflecting surface for reflecting the light ray refracted by the refractive surface, and a non-light incidence surface upon which a light ray emitted from said light emitting body is not incident directly because the light ray is blocked by a front Fresnel prism is formed in substantially parallel with a base surface on which the plurality of Fresnel prisms are arranged.

4. The transparent screen according to claim 3, wherein the plurality of Fresnel prisms of the Fresnel optical element have a pitch longer than 50 times as long as the typical light wavelength and shorter than one-tenth of a size of projected pixels.

5. The transparent screen according to claim 4, wherein the lens element has a lens pitch longer than 10 times as long as the light wavelength and shorter than one-tenth of the size of the projected pixels.

6. A projection display device including:
a transparent screen; and
a light emitting body for applying image light to said transparent screen,
wherein said transparent screen includes:
a Fresnel optical element having prisms which are formed on a side of a light entering surface thereof as viewed from a side of said light emitting body;
a first base for holding said Fresnel optical element;
a second base that holds a lens element that provides an angle of diffusion for image light emitted from said light emitting body and transmitted through the Fresnel optical element to diffuse said image light, which are arranged in turn therein;
a first light diffusing element disposed behind said Fresnel optical element; and
a second light diffusing element disposed behind said second base including at least two light diffusing layers, and
wherein a predetermined gap is provided between said first light diffusing means and said second light diffusing means, and a bonding layer bonds the lens element to the second base, the bonding layer being separate from the second light diffusing element.

7. The projection display device according to claim 6, wherein said second light diffusing element includes at least two types of particulates having different particle sizes and each having a refractive index difference Δn between themselves and a medium of said second light diffusing element which satisfies Δn <0.03, and a first type of particulates included in said at least two types of particulates has a particle size which falls within a range of 10 to 20 times as long as a typical light wavelength, and a second type of particulates included in said at least two types of particulates has a particle size which falls within a range of 50 to 100 times as long as the typical light wavelength.

8. The projection display device according to claim 7, wherein in said Fresnel optical element, a plurality of Fresnel prisms are arranged in a sawtooth shape, each of said plurality of Fresnel prisms having a refractive surface for refracting a light ray emitted from the light emitting body, and a reflecting surface for reflecting the light ray refracted by the refractive surface, and a non-light incidence surface upon which a light ray emitted from said light emitting body is not incident directly because the light ray is blocked by a front Fresnel prism is formed in substantially parallel with a base surface on which the plurality of Fresnel prisms are arranged.

9. The transparent screen according to claim 8, wherein the plurality of Fresnel prisms of the Fresnel optical element have a pitch longer than 50 times as long as the typical light wavelength and shorter than one-tenth of a size of projected pixels.

10. The transparent screen according to claim 9, wherein the lens element has a lens pitch longer than 10 times as long as the light wavelength and shorter than one-tenth of the size of the projected pixels.

11. A image display method, implemented on a display device including in a transparent screen, comprising:
- holding, at a first base, a Fresnel optical element having prisms which are formed on a side of a light entering surface thereof as viewed from a side of a light emitting body;
- holding, at a second base, a lens element that provides an angle of diffusion for image light emitted from said light emitting body and transmitted through the Fresnel optical element to diffuse said image light;
- diffusing the image light, at a first light diffusing element disposed behind said Fresnel optical element;
- blurring, at a second light diffusing element disposed behind said second base including at least two light diffusing layers, at least either of image light emitted from said first light diffusing element and image light emitted from said second light diffusing element within limits of a size of projected pixels; and
- bonding, at a bonding layer, the lens element to the second base, the bonding layer being separate from the second light diffusing element.

12. The transparent screen according to claim 1, further comprising:
- a surface layer formed on a surface of the second base opposite the lens element,
- wherein the lens element includes assistant lenses and a plurality of trapezoidally-shaped lenses extending away from the second base.

13. A transparent screen comprising:
- a Fresnel optical element having prisms which are formed on a side of a light entering surface side thereof as viewed from a side of a light emitting body;
- a first base for holding said Fresnel optical element;
- a second base that holds a lens element that provides an angle of diffusion for image light emitted from said light emitting body and transmitted through the Fresnel optical element to diffuse said image light;
- a first light diffusing means for diffusing light disposed behind said Fresnel optical element; and
- a second light diffusing means for diffusing light disposed behind said second base,
- wherein a predetermined gap is provided between said first light diffusing means and said second light diffusing means, and a bonding layer bonds the lens element to the second base, the bonding layer being separate from the second light diffusing means.

14. The transparent screen according to claim 1, wherein a predetermined gap is provided between the at least two light diffusing layers based on a size of projected pixels.

15. The transparent screen according to claim 1, further comprising:
- a surface layer bonded to a surface of the second base opposite the lens element via a second bonding layer separate from the second light diffusing element.

* * * * *